US012792749B2

(12) United States Patent
Secareanu

(10) Patent No.: US 12,792,749 B2
(45) Date of Patent: Nov. 10, 2026

(54) BINARY ENCRYPTION / DECRYPTION METHOD FOR SECURE AUDIO / VIDEO BROADCAST AND COMMUNICATION AND FOR DATA TRANSMISSION / STORAGE

(71) Applicant: Radu Mircea Secareanu, Phoenix, AZ (US)

(72) Inventor: Radu Mircea Secareanu, Phoenix, AZ (US)

(73) Assignee: Radu Mircea Secareanu, Phoenix, AZ (US)

( * ) Notice: Subject to any disclaimer, the term of this patent is extended or adjusted under 35 U.S.C. 154(b) by 37 days.

(21) Appl. No.: 18/977,626

(22) Filed: Dec. 11, 2024

(65) Prior Publication Data

US 2025/0181731 A1 Jun. 5, 2025

Related U.S. Application Data

(63) Continuation-in-part of application No. 17/573,438, filed on Jan. 11, 2022, now Pat. No. 12,192,323.

(51) Int. Cl.
*G06F 21/60* (2013.01)
*H04N 21/2347* (2011.01)

(52) U.S. Cl.
CPC ....... *G06F 21/602* (2013.01); *H04N 21/2347* (2013.01)

(58) Field of Classification Search
None
See application file for complete search history.

(56) References Cited

U.S. PATENT DOCUMENTS

2020/0162113 A1* 5/2020 Hong .................... H03M 13/13

FOREIGN PATENT DOCUMENTS

JP 2007336244 A * 12/2007
KR 101568069 B1 * 11/2015 ........... C08K 5/3435
WO WO-2020095382 A1 * 5/2020 ........... H04L 9/0618

* cited by examiner

*Primary Examiner* — Jeffrey R Swearingen

(57) ABSTRACT

An encryption/decryption method is disclosed, where an input data string is described in term of a reference set of unique processing strings of number of bits between minimum and maximum, with these being organized in classes of members of same number of bits, where one or more classes are modified by permutating their members such obtaining a modified set, where directional correspondence reference-to-modified of a member is the encryption/decryption of that member, described in an encryption/decryption key with such keys being stored to be specific to every encryption/decryption enabled device, where such enabled devices exchange encrypted data using such key that is dedicated to a pair of devices only, without sharing such key on the communication channel, and where a central switchboard connects such communicating devices to enable exchanging encrypted data, concealing the communicating devices.

15 Claims, 12 Drawing Sheets

| 401 | 402 Actual | 403 Sum4 404 Description | 405 Actual | 406 Sum5 407 Description |
|---|---|---|---|---|
| 1 | 1111 | 000 | 11111 | 0000 |
| 2 | 112 | 001 | 1112 | 0001 |
| 3 | 121 | 010 | 1121 | 0010 |
| 4 | 211 | 011 | 1211 | 0011 |
| 5 | 22 | 100 | 2111 | 0100 |
| 6 | 13 | 101 | 122 | 0101 |
| 7 | 31 | 110 | 212 | 0110 |
| 8 | 4 | 408 111 | 221 | 0111 |
| 9 | | | 113 | 1000 |
| 10 | | | 131 | 1001 |
| 11 | | | 311 | 1010 |
| 12 | | | 23 | 1011 |
| 13 | | | 32 | 1100 |
| 14 | | | 14 | 409 1101 |
| 15 | | | 41 | 410 1110 |
| 16 | | | 5 | 411 1111 |

*FIG. 4*

| 501 | 502 Need | 503 Available | 504 Remain | 505 Worth |
|---|---|---|---|---|
| Sum4 | 7 | 8 | 1 | |
| Sum5 | 13 | 16 | 3 | |
| Sum6 | 24 | 32 | 8 | |
| Sum7 | 44 | 64 | 20 | |
| Sum8 | 81 | 128 | 47 | |
| Sum9 | 149 | 256 | 107 | |
| Sum10 | 274 | 512 | 238 | |
| Sum11 | 504 | 1024 | 520 | |
| Sum12 | 927 | 2048 | 1121 | |
| Sum13 | 1705 | 4096 | 2391 | |
| Sum14 | 3136 | 8192 | 5056 | |

| Identifier | Meaning | PS type |
|---|---|---|
| 0000 | 4 | Exception PS |
| 0001 | 1_4 | Full PS |
| 0010 | 2_4 | Full PS |
| 0011 | 3_4 | Full PS |
| 0100 | 4_4 | Full PS |
| 0101 | 5_4 | Full PS |
| 0110 | 6_4 | Full PS |
| 0111 | 7_4 | Full PS |
| 1000 | 8_4 | Full PS |
| 1001 | 9_4 | Full PS |
| 1010 | 10_4 | Full PS |
| 1011 | 11_4 | Full PS |
| 1100 | 12_4 | Full PS |
| 1101 | 13_4 | Full PS |
| 1110 | 14_4 | Full PS |
| 1111 | >= 5 | Exception PS |

901 902

903

| No | Class |
|---|---|
| 1 | 4 |
| 2 | >4 |
| 3 | 1_4 |
| 4 | 2_4 |
| 5 | 3_4 |
| 6 | 4_4 |
| 7 | 5_4 |
| 8 | 6_4 |
| 9 | 7_4 |
| 10 | 8_4 |

FIG. 9

| | 901 No | 902 Class |
|---|---|---|
| | 11 | 9_4 |
| | 12 | 10_4 |
| | 13 | 11_4 |
| | 14 | 12_4 |
| | 15 | 13_4 |
| | 16 | 14_4 |
| 904 | 16+k | (14+k)_4 |
| 905 | (16+m)+1 | (14+m+1)_3 |
| 906 | (16+m)+2 | (14+m+2)_2 |
| 907 | (16+m)+3 | (14+m)_3_1 |
| 908 | (16+m)+4 | (14+m+1)_2_1 |
| 909 | (16+m)+5 | (14+m+2)_1_1 |
| 910 | (16+m)+6 | (14+m)_3_2 |
| 911 | (16+m)+7 | (14+m+1)_2_2 |
| 912 | (16+m)+8 | (14+m+2)_1_2 |
| 913 | (16+m)+9 | (14+m)_3_3 |
| 914 | (16+m)+10 | (14+m+1)_2_3 |
| 915 | (16+m)+11 | (14+m+2)_1_3 |
| 916 | (16+m)+12 | (14+m+3)_4 |

FIG. 10

BINARY ENCRYPTION / DECRYPTION METHOD FOR SECURE AUDIO / VIDEO BROADCAST AND COMMUNICATION AND FOR DATA TRANSMISSION / STORAGE

CROSS-REFERENCE TO RELATED APPLICATIONS

Application is a Continuation-in-Part (CIP) Application, claiming benefit of the following non-provisional (parent) application:

Application Number: Ser. No. 17/573,438
Applicant Name: Radu Mircea Secareanu
Filing date: 11 Jan. 2022

Full specification and drawings of the parent application are included, with the new matter added for CIP following in every section of the disclosure.

FIELD

The present disclosure relates to data encryption/decryption methods, and in particular to binary data encryption/decryption methods that are suitable to be implemented in silicon, as a circuit, in addition (or not only) to be implementable in software.

BACKGROUND

Certain aspects disclosed in the utility patent application (UPA) mentioned below are being used in the present disclosure. This UPA is filed by the same unique inventor as the present disclosure. This UPA is mentioned here as background for this disclosure. The present disclosure represents new matter. This background utility patent application (UPA) is:

EFS ID: 43475104
Application Number: 17398728
Applicant Name: Radu Mircea Secareanu
Filing date: 10 Aug. 2021

SUMMARY

There are two primary aspects that are disclosed:

a. The data encryption/decryption method in itself
b. The suitability of the disclosed data encryption/decryption method for hardware implementation Across the disclosure, the data encryption/decryption method will be referred to as "method", or "technique", or DED method, all being equivalent.

Regarding the first disclosed aspect—the data encryption/decryption method in itself. At the onset, a note regarding the structure of this disclosure is required, note that will enable better understanding of the flow of the disclosure. Key concepts are defined, detailed, exemplified, concepts that the disclosed embodiments from the present disclosure are based on. The DED method in progressively introduced during this process.

In summary, the DED method works as follows: an Initial Full Data String (IFDS) is serially partitioned into a number of sequential Processing Strings (PS), where the length of each PS is determined by two conditions: 1) the occurrence of a fixed bit pattern, called Delimiter (DE) or by the reach of a set limit number of bits, and 2) by the desired encryption strength to be implemented. The concept of "encryption strength" in this context will be detailed later in this disclosure. Every such determined PS is classified and then encrypted in two independent ways:

a) individually, every PS is encrypted as a whole, and
b) the said PS classification of every two adjacent PS, are encrypted Once the end of the IFDS is reached, it is called that the end of one encryption cycle is reached. Yet another encryption cycle can be applied to the data by repeating the process, using as new IFDS the output of the just completed cycle, since the said output has a very different structure as compared to the initial input IFDS. The size of the output from one completed cycle is exactly the same as the size of the input IFDS, no matter the said size of PS, or said applied encryption of the individual or every two adjacent PS, therefore the size of the data is always the same, no matter the encryption complexity. Unlimited number of cycles can be processed for unlimited encryption complexity, as will be disclosed here. The decryption is perfectly mirrored to the encryption process, leading to an identical restored file to the initial IFDS, which was the input to the first cycle.

In summary, there are several fundamental encryption approaches disclosed here:

1. The length of the partitioned PS represents an encryption choice applicable to every IFDS. There are thirteen lengths considered as practical, that are proposed and discussed. For sophisticated encryption applications, the length of the partitioned PS has no theoretical limits-practically, the only limitation, or cost, being the memory that is associated to an increase in PS length, as explained in the disclosure
2. Individual PS encryption-same PS can have a different encryption during one given cycle. There are several encryption variables applicable in this category, as will be detailed in this disclosure.
3. Two consecutive PS can be paired and have a different encryption during one given cycle. There are several encryption variables applicable in this category as well, as will be detailed in this disclosure.
4. The above three encryption approached can be varied without any limits by repeating the cycle unlimited times, i.e., the above mentioned encryption choices (variability) are multiplied in term of variability by the number of cycles.

The practically unlimited encryption choices, or encryption space, will become apparent, as the disclosure is being presented. An important highlight is regarding an important goal of this disclosure—the encryption space has practically no limits, but even with all this space, the file remains the same size no matter the encryption complexity. While this is a goal of this disclosure, the embodiments disclosed here are in no way limiting to be applied to a file compression or expansion process that occurs before or during the encryption/decryption process.

Regarding the second disclosed aspect—the suitability of the disclosed DED method for hardware implementation. As will be apparent from the details presented in this disclosure to a person familiar with digital design, the DED method can be immediately implemented using basic digital circuitry. In addition, due to the serial nature of the DED method, the various stages of combinatorial logic are suitable to be placed in a pipeline (again, a concept familiar for people skilled in digital design), the pipeline implementation (in a single, non-parallel data path) providing the highest encryption/decryption speed possible in a hardware implementation.

A topic of interest is an indication regarding the implementation complexity and performances of the encryption/decryption process. This will be summarized briefly next, referring to a hardware implementation of the DED method.

A software implementation of the DED method is going to be discussed in this disclosure as a parallel to the hardware implementation which receives first priority in this disclosure.

Referring to the four encryption approaches outlined above, the first three are applicable within any given cycle. The fourth encryption approach refers to repeating cycles, where the encryption choices applicable to the first three approaches are changed. To give an order of magnitude estimation for the encryption speed, consider that the encryption chip operates with a 2 GHz clock, in-between two consecutive pipeline stages there are twenty clock cycles, and one PS flows sequentially through the pipeline over every pipeline stage. Consider two cases—encryption in one cycle (1, 2, 3 approaches apply), and encryption in multiple cycles (1, 2, 3, 4 approaches apply).

1. Encryption in one cycle
   a. The encryption speed is (size of IFDS)/(average size of PS)*(20 clock cycles)
      i. Example 1: size of IFDS is 1 Mbit and average size of PS is 20 bits—speed is 1 million clock cycles. At 2 GHZ clock, that is 0.5 ms.
      ii. Example 2: size of IFDS is 2 Gbits and average size of PS is 10 bits—speed is 200 million clock cycles. At 2 GHZ clock, that is 0.1 s.
   b. Another way to look at speed for one cycle encryption is from the point of view of latency of the data flow. In this case, encrypted data is available every 20 clock cycles (every one pipeline stage latency)—which means that from this point of view, in the one cycle case, the encryption speed is one pipeline stage (20 clock cycles). At 2 GHz clock, that is 10 ns.
2. Encryption in multiple cycles
   a. The encryption speed is (size of IFDS)/(average size of PS)*(20 clock cycles)*(number of cycles)
      i. Example 1: size of IFDS is 1 Mbit and average size of PS is 20 bits, 10 cycles—speed is 10 million clock cycles. At 2 GHz clock, that is 5 ms.
      ii. Example 2: size of IFDS is 2 Gbits and average size of PS is 10 bits, 5 cycles—speed is 1 billion clock cycles. At 2 GHz clock, that is 0.5 s.
3. For both encryption in one cycle and encryption in multiple cycles, for the first cycle only, there will be a data latency coming from the data preparation, as will be discussed in the disclosure. This data latency depends on the desired encryption strength.

Decryption speed is essentially similar (or largely equal) to the encryption speed.

In conclusion of this summary chapter, the embodiments that are disclosed here permit the following highlights to be stated:

i. The DED method offers four fundamental encryption approaches, with practically an unlimited variation for encrypting a binary file.
ii. The encrypted file is always the same size as the original file, no matter the encryption complexity that is being applied.
iii. The DED method can be implemented in hardware straightforward, in a pipelined, memory based architecture, leading to a high data throughput.
iv. The encryption speed is essentially the same as the decryption speed, where said speed is directly proportional with the number of encryption cycles and the size of the binary string to be encrypted.

BRIEF DESCRIPTION OF DRAWINGS

Embodiments will be described, by way of example, with reference to the drawings, in which

FIG. 4, FIG. 5, FIG. 6, and FIG. 7 are used to summarise the procedure to create the unique correspondence and assignment between an input PS and the corresponding output description, unique correspondence and assignment used in one or more of the embodiments.

FIG. 9 and FIG. 10 are used to introduce how to uniquely describe any input binary string in term of processing strings and constructs specific to this disclosure, unique description that is used in one or more of the embodiments.

DETAILED DESCRIPTION OF THE INVENTION

At the outset it should be noted that the examples presented in the disclosure are in no way limiting, and the skilled person will appreciate that the disclosure is equally applicable to multiple variations and alternatives, and multiple optimizations are possible to increase the performance, such as the encryption variability.

Several concepts relevant for this disclosure are discussed in detail next, including by using examples.

1. First bit (FB), alternate bits (AB), and relative bits (RB)
2. Delimiter (DE) and link bit (LB)
3. Bit sum (Sum) and processing string classification (PS class)
4. Processing string format (PS format) as full PS, exception PS, and termination PS
5. PS input core acceptable configurations (ICAC), PS output description configurations (ODC), and PS remain output description configurations (RODC).
6. Root identifiers (RI) and absolute identifiers (AI)

Figure 1:
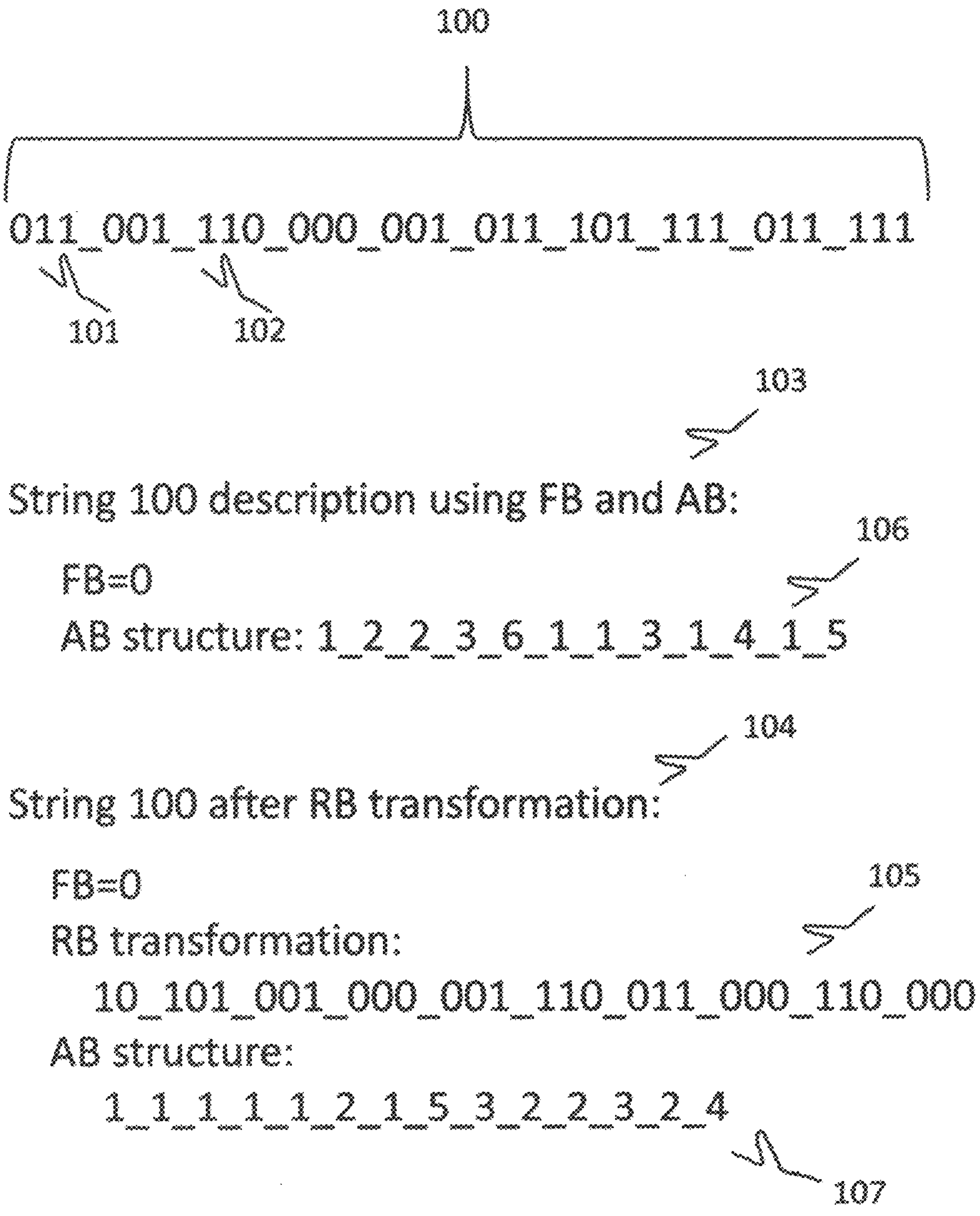
FIG. 1 is used to summarise several key concepts for this disclosure, such as first bit (FB), alternate bits (AB), relative bits (RB), and RB transformation, concepts used in one or more of the embodiments.

FIG. 1 is used to summarise the FB, AB, and RB concepts.

a. In any binary string, there are groups of same type bits, with the bits in any two such consecutive groups alternating. String 100 is an example string, considered here to exemplify the concepts. In string 100, 101 is the first bit (FB) in this string, with a value of 0. 102 is pointing to an underscore, used to improve string readability in this discussion.
b. String 100, rewritten in term of AB, is shown at 106. The numbers represent the number of bits in alternating groups of same type bits. 103 represents string 100, rewritten in term of FB and AB.

c. The relative bit is defined as the change in the upcoming bit relative to the current bit. If the upcoming bit changes value (0 to 1 or 1 to 0), the relative bit has a value of 1. If the upcoming bit has a constant value (0 to 0 or 1 to 1) the relative bit has a value of 0.

d. The RB transformation of string 100 is shown at 105, while the string 100 rewritten to incorporate RB transformation, in term of AB and FB is shown at 104 (107).

Figure 2:
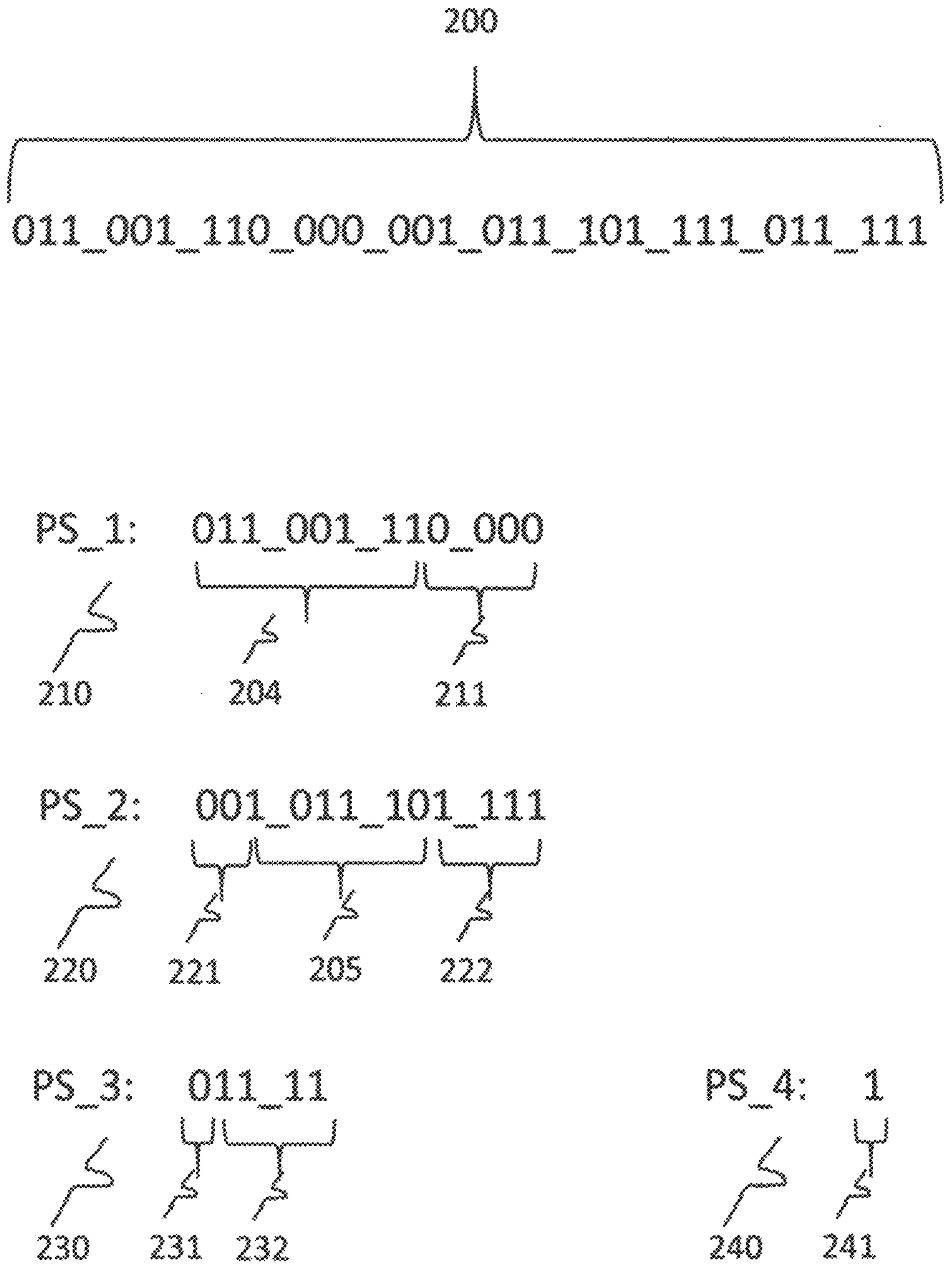
FIG. 2 and FIG. 3 is used to summarise additional key concepts for this disclosure, such as delimiter (DE), link bit (LB), processing string (PS), PS core, and PS characteristic number (or Sum), concepts used in one or more of the embodiments.
Figure 3:
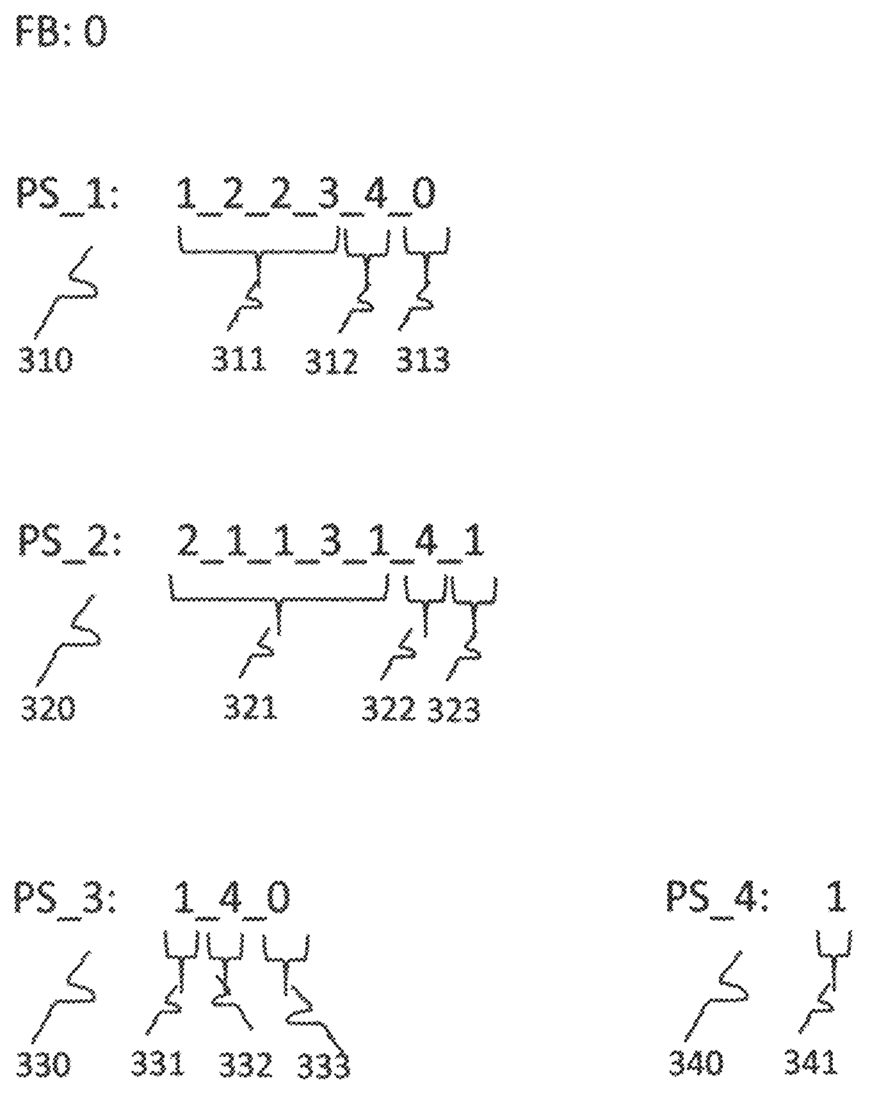

FIG. 2 and FIG. 3 is used to summarise the DE, LB, PS, PS core, and PS characteristic number (or Sum) concepts a. A delimiter (DE) is defined as a group of bits of a chosen pattern. A group of four same type bits is used in this disclosure as DE.

b. DE is used to define a PS-a PS is defined as any collection of groups of same type bits in-between two consecutive DE, where said collection ends with a DE, and where, for the DE defined as a group of four same type bits, any such group in-between two consecutive DE has less than four same type bits.

c. Given the above definitions, string 200 in FIG. 2 has two PS (PS_2 and PS_3, shown as 220 and 230). PS_1 (210) is the first PS in the string, and PS_4 (240) is the last PS in the string.

d. The link bit (LB) is introduced because after a DE, same type or opposite type bits can follow. For example, 221 has the same type bit as the 211 DE, while 231 has the opposite type bit as the 222 DE. LB has a value of 0 if same type bits follow, and has a value of 1 if opposite type bits follow.

e. In FIG. 2, 204 for PS_1, 221 plus 205 for PS_2, and 231 for PS_3 are called PS core. 241 for PS_4 (termination PS) is called PS content.

f. In FIG. 2, the IFDS (200) and every PS have been described in term of absolute bits for clarity. However, in this disclosure, the equivalent FB/AB representation (detailed in FIG. 3) is required (where AB can be a representation of IFDS RB transformation).

g. In FIG. 3, the FB/AB for PS_1, PS_2, PS_3, and PS_4 are shown as respectively 310, 320, 330, and 340. For PS_1, PS_2, and PS_3, 311, 321, and 331 respectively represent the PS content, 312, 322, and 332 represent the PS DE, 313, 323, and 333 represent the PS LB. For PS_4 termination PS, 341 is the content.

h. With reference to FIG. 3, adding all the bits in a PS core, a PS characteristic number, or Sum, is obtained. For PS_1, 311 gives a Sum of 8, for PS_2, 321 gives a Sum of 8, for PS_3, 331 gives a Sum of 1. Sum cannot be defined for a termination PS.

a. The three PS are classified as Sum_DE, namely PS_1 as 8_4, PS_2 as 8_4, PS_3 as 1_4.

i. As mentioned, LB is introduced to handle the bits coming after a DE. When DE consists of four same type bits (as considered in this disclosure):

a. If the bits coming after a DE are less than four same type bits, then these bits become part of the next PS (as exemplified by PS_2 and PS_3 above).

b. If the bits coming after a DE are four or greater same type bits, these bits become what is called an exception PS. The characteristic of an exception PS is that it has a core of zero bits, the content is made of all bits of same type following a DE until that bit type changes value, and since the content indicates when the bit changes value, an exception PS does not need a link bit.

c. An exception PS always comes after a DE, with the only exception being that it can be the first PS in an IFDS.

There are four types of supported PS therefore:

Full PS, always in-between two consecutive DE or as the first PS in an IFDS, having a core, a DE, and a link bit, defined as class Sum_DE (for example, 1_4).

Exception PS, always follows a DE or is the first PS in an IFDS, having a content only, where the content is always greater or equal to four same type bits.

Termination PS, always the last PS in an IFDS.

Open-string PS, always following a full PS, an exception PS, or another open string PS, having core only and characterized by the fact that the core reaches a set number of bits without a DE occurring.

All the concepts above describe how to identify, classify, and format a PS in an input IFDS. The next concepts refer to how to uniquely format the output in accordance to each and every input PS. To exemplify this unique correspondence that is being created between input PS and output, initial focus is on full PS.

Figures 5, 6:
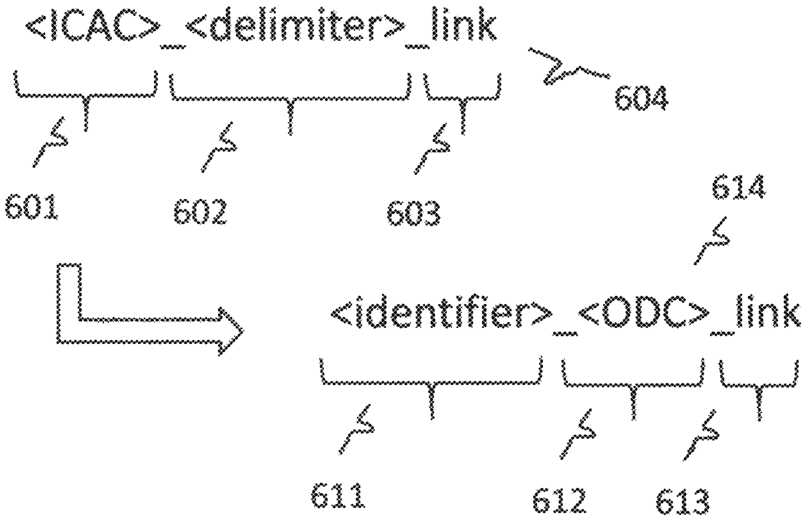

As mentioned, a full PS consists of core, DE, and LB. Each of these three components will be discussed, outlining the unique input-output correspondence and transformation.

a. The four bit DE at the input becomes a four bit identifier at the output, uniquely identifying the input PS classes.

b. The core:

a. When written in FB/AB format, two configurations are enabled to have the same description, and this constitutes one of the main advantage of using the FB/AB format. For example, in class 4_4, configurations 0110 and 1001 (absolute bits) have the same AB format description, namely 121 (one bit-two bits-one bit).

b. Core configurations containing groups of 1, 2, and 3 same type bits are called acceptable configurations. There are also non-acceptable configurations. To understand the concept of acceptable and non-acceptable configurations, the delimiter rule (i.e., the rule that says that in-between two delimiters only groups of 1, 2, and 3 same type bits can exist) will be ignored in the discussion to follow. The position of two initial delimiters is maintained. By ignoring the delimiter rule but keeping the location of the initial delimiters, groups of four or more same type bits in-between two delimiters can exist. For example:

i. A PS class with Sum smaller than 4 (classes 1_4, 2_4, and 3_4), has only acceptable configurations.

ii. A PS class with Sum greater or equal to 4 has both acceptable and non-acceptable configurations. These are exemplified in FIG. 4, for the first two classes with Sum greater or equal to 4 (class 4_4, and class 5_4, for which Sum=4 (shown as 403) and Sum=5 (shown as 406)). Looking at the 401 index, for class 4_4, the first seven configurations of the core are acceptable, while the 8th configuration (408) is not acceptable. Similarly, for class 5_4, the first 13 configurations are acceptable, while the last three (409, 410, and 411) are not acceptable.

c. Both the acceptable and non-acceptable configurations receive a unique description 404/407 that correspond to every actual existing input core configuration 402/405.

d. The acceptable configurations are called ICAC (input core acceptable configurations). The unique description corresponding to every ICAC is called ODC (output description configuration), while the description corresponding to every non-ICAC configuration is called RODC (remain output description configuration).

e. RODC increases as the class order (or SUM) increases. This is shown in FIG. 5.
   i. As mentioned, class 1_4, 2_4, and 3_4 (Sum=1, Sum=2 and Sum=3) have only ICAC, therefore do not have RODC.
   ii. Classes 4_4 to 14_4 (Sum=4 to Sum=14, listed in column 501), all have RODC. The number of RODC for every class is listed in column 504. As shown, this number increases as the class order increases. Column 502 represents the ICAC for a respective class, while column 503 represents the total supported configurations in that class (ODC+RODC). The worth factor (column 505) will be discussed later.

c. The LB
   a. Note that LB for a PS in an input IFDS is an abstract concept, i.e. it is a bit that does not exist in reality. This bit is defined and introduced because, the same LB, with the same value, is required in the unique corresponding output.

In FIG. 6, the input (604) to output (614) transformation for a full PS is shown. 601, 602, and 603 are the three input components (core or ICAC, DE, LB), and 611, 612, and 613 are the three output components (identifier, ODC corresponding to ICAC, and LB).

Figure 7:
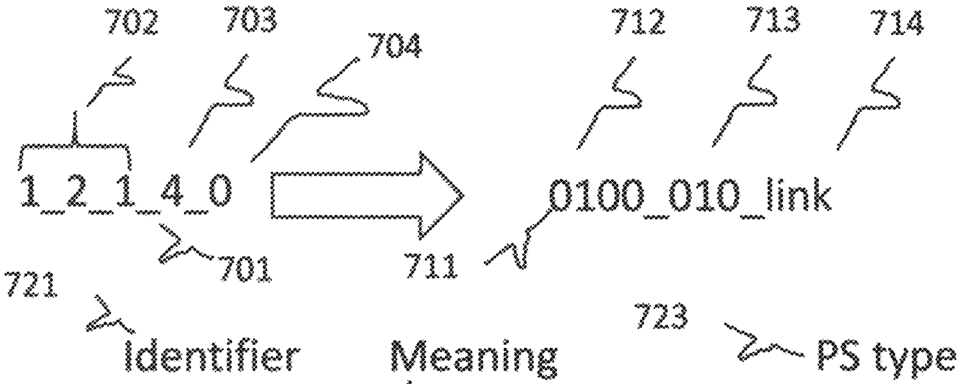

An actual example of such input-output transformation, together with a full list of identifiers and their meaning, are shown in FIG. 7. The input PS is 701, consisting in core (702), DE (703) and LB (704). To this specific input PS, the corresponding output is 711, with 712 being the identifier, 713 being the ODC, and 714 being LB. Note that 713 (010) corresponds to the 121 core, as shown in FIG. 4 at class 4_4, while the identifier for class 4_4 (column 722) is 0100, shown by 724, corresponding to a full PS as indicated in column 723. The list of all identifiers, for all classes, is detailed in column 721.

The identifiers listed in column 721 are called core identifiers. Note that they are used for exception PS (0000 and 1111), for PS classes that do not generate RODC (0001, 0010, and 0011), and for PS classes that generate RODC (all other 11 identifiers).

The RODCs generated by the 11 classes that generate RODC (classes 4_4 to 14_4) become identifiers in themselves for PS classes larger than 14_4 and for open string PS.

These RODCs are characterized by a "Worth" factor-column 505 in FIG. 5. To give an example of such a worth factor, consider the single RODC generated by class 4_4. This RODC becomes a seven bit identifier (0100_111) for classes larger than 4_4. This 7 bit identifier can cover two class 5_4 configurations, 4 class 6_4 configurations, 211 class 15_4 configurations, and so on, for every class, the worth factor increases by a factor of 2.

Next, the concepts of absolute identifier (AI) and root identifier (RI) are reviewed.

An absolute identifier represents the full description of the output configuration used to describe an input PS.

For example, if the input PS is a class 4_4 full PS, specifically 1_2_1_4, this corresponds to an output description of 0100_010, and this is known as the absolute identifier for the 1_2_1_4 full input PS. Of course, the AI for a full PS is always followed by an LB, but the LB is not part of the AI.

A root identifier (RI) is defined as the minimum common root to describe a group of AI within a single class only.

For example, considering class 4_4 for this discussion: the 7 configurations of class 4_4 can be described as 4+2+1 in term of primary binary numbers.

Accordingly, class 4_4 has three root identifiers, the first one representing a group of 4 configurations, the second one representing a group of 2, and the third one representing a group of 1 configuration.

The root identifier consists of the core identifier (see FIG. 7), followed by the root of each of the three groups (see FIG. 4): 0100_0 for the first group, 0100_10 for the second group, and 0100_110 for the third group.

Therefore, class 4_4 has three RI-a five bit RI representing a group of 4 configurations, a six bit RI representing a group of 2 configurations, and a seven bit RI representing a group of 1 configuration. The three root identifiers are called to be of class 5, class 6, respectively class 7.

The three RIs, as described, are primary RIs. These can be transformed in three 6 bit RI (with two configurations each) and one 7 bit RI, or can be transformed in seven 7 bit RI.

Figure 8:
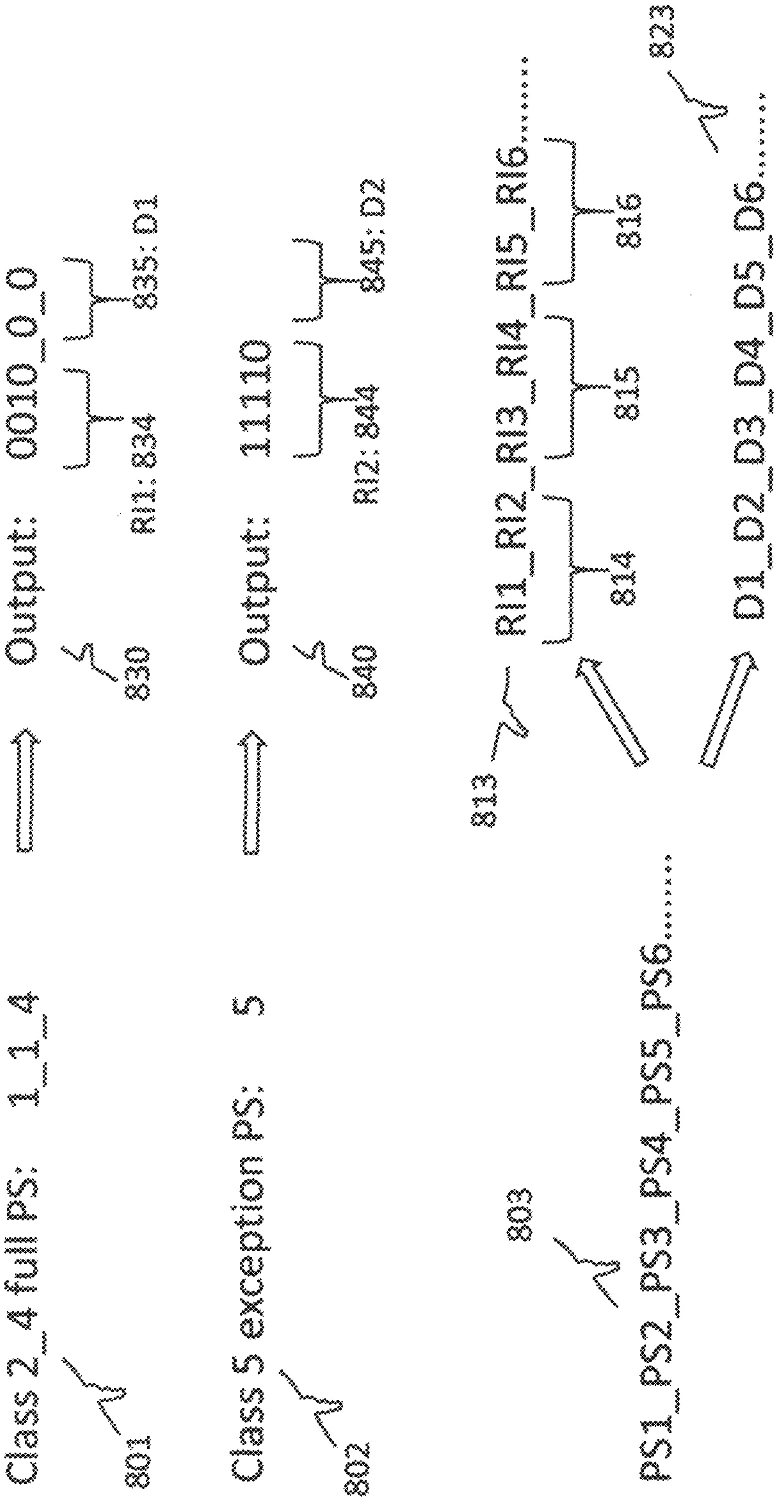
FIG. 8 is used to summarise the concepts of absolute identifier (AI) and root identifier (RI), as well as the procedure in which these are used, concepts and procedure used in one or more of the embodiments.

When an output is described using RIs, the output will consist of two strings, instead of 1 string, as exemplified in FIG. 8, where two PS are considered as an example for this discussion.

The first PS, 801, is a class 2_4 full PS. Normally, this is unitary described at the output as 830. Any such unitary output of a PS has two components: an RI (RI1, as 834) and a detail (DI1, as 835), detail part representing the remainder after removing the RI.

The second PS is an exception PS, 802, normally described as 840, and described in term of RI and detail as 844 and 845. Note that for exception PS, the detail part is null.

The regular output would be 803 (a single string, consisting of one output PS after another, in order).

When RI plus Detail description is used, the output will consist of two strings, 813 and 823, one string consisting of RIs, and the other string consisting of details of each output PS, in order. In the RI string, the RIs are paired, as shown by 814, 815, 816, for further processing, as will be shown. No further processing is performed in the detail string.

One of the key goals of this disclosure is the development of a DED method where, irrespective of the DED complexity, the size of the encrypted/decrypted file remains exactly the same as the initial file. This goal is achieved by defining a set of limited number of PS classes so that any IFDS can be encrypted and then seamlessly reversed (decrypted). This limited number of PS classes is defined and discussed with reference to FIG. 9 and FIG. 10 (FIG. 10 is a continuation of FIG. 9). In these two figures:

901 column is an index, or a counter, showing how many PS classes.

902 column is showing the corresponding PS class, for every index.

The 903 row in FIG. 9 relates to exception PS (per the exception PS definition). In reality, there is a class for exception PS of class 5, one for class 6, and so on. Row 903 condenses all these classes into one entry. As shown in FIG. 7, exception PS of greater or equal to 5 same type bits uses the core identifier 1111 (5 is 1111_0, 6 is 1111_10, 7 is 1111_110, and so on).

Classes 1_4 to 14_4 do not require any further comments. These are full PS classes, and have been discussed also with reference to FIG. 7 and partly with reference to FIG. 5.

At row 904 in FIG. 10, variable k is introduced.

This k variable has a range from 1 to m, with m being the maximum value. Variable m can be minimum 1, case in which the range for k is 1 to 1, i.e. 1.

All classes (14+k)_4 are regular, full PS classes. Note that position 904 represents multiple entries. For example, if m=10, position 904 represents ten entries, i.e. ten classes, from 15_4 to 24_4. If m=1, position 904 represents one entry, i.e. class 15_4.

The value for m is chosen as one of the variables to increase the encryption strength. The larger the m value, the stronger the encryption, but the larger the complexity, where one of the implementation measures for complexity is the memory needs.

Since the memory needs is mentioned, clarifications are required. For example, if m=1, the memory needs needed to encrypt all configurations is about 190 k binary words of 22 bits. If m=13, the memory needs to encrypt all configurations reaches about 300M binary words of 34 bits. As m increases further, the trend is apparent (memory increases and the binary word necessary for one memory location increases).

Starting with 905, the maximum value of k, m, is relevant.

To focus the discussion, m=1 (k=1) will be considered.

904, position 17, is class 15_4.

905 and 906 are classes 16_3 and 17_2.

Regular full PS classes, of format such as 15_4 (generally x_4) mean that in the 15 bits preceding the 4 same type bit DE termination, any combination of same type bit groups of 1, 2, and 3 bits can occur. Classes 16_3 and 17_2 have the same meaning, but the termination is 3, respectively 2 same type bits. Both classes 16_3 and 17_2 use a link bit just like a regular full PS, so, after the 3, respectively 2 termination, any number of bits of same type or opposite type as the termination can occur.

Positions 907 to 915 consist of three groups of classes: the 15_3 group, the 16_2 group, and the 17_1 group.

Each group consists of three classes: 15_3_1, 15_3_2, and 15_3_3, then 16_2_1, 16_2_2, and 16_2_3, respectively 17_1_1, 17_1_2, and 17_1_3.

The meaning of the three numbers is as discussed above. For example 15_3_1:15 supports any combination of 1, 2, and 3 same type bits, and 3 and 1 are terminations of 3 respectively 1 same type bit groups. The last bit in the 15 always changes value with the group of 3, which always changes value with the group of 1.

The first two numbers always make 18 when summed (15+3, 16+2, and 17+1).

15_3, 16_2 and 17_1 are the only possible combinations in an 18 bit in the defined conditions disclosed here.

The third bit is always 1, 2, and 3 for all three 15_3, 16_2, and 17_1 groups.

None of the nine classes require a link bit (LB). This is key, because it allows to "pack" double the amount of output combinations in the same number of bits. This also means that the bit coming after the 1, 2, respectively 3 same type bit termination, always changes value.

Note that all three groups generate 18_1, 18_2, and 18_3, in different configurations (as 15_3, 16_2, or 17_1). So, in order to close and have any combination possible, regular 18_4 full PS class (with LB) is needed to be added—and that is done on position 916 (position 29 for m=1).

Accordingly, the above collection of classes, as presented and discussed with regard to FIG. 9 and FIG. 10, permit the encryption of any IFDS, using a predefined maximum number of bits.

In the case of m=1, this predefined maximum number of bits is 22 (18+4 from class 18_4).

In the case of m=13, this predefined number of bits is 34 (30+4 from class 30_4).

For any m, classes at positions 907 to 915 offer the needed open string, as defined. Classes at 907 to 915 are open string PS classes. These classes clearly have their own RI.

The number of required classes to cover any IFDS depends on the encryption strength that is chosen. For example, for m=1, 29 classes are needed. For m=13, 41 classes are needed. In other words, the number of classes required to cover any IFDS is 28+m.

Full PS, exception PS, and open string PS have all been clarified. A few words about a termination PS are required.

As described, the largest class, in term of bit length, is class 18_4 for m=1, and 30_4 for m=13. That is a 22 bit respectively 34 bit maximum PS, for a number of classes equal to 28+m. This indicates that the maximum PS can be written in tem of number of classes as 28+m−7, or 21+m.

A termination PS is defined as a string of data, (21+m) bits or less in length, representing the last bits before the end of an IFDS.

In other words, the last (21+m) bits or less of an IFDS are not processed through the normal procedure as described in this disclosure, no matter what these last (21+m) bits or less contain, including if these bits contain a full PS of any class that fits in the (21+m) bit space, an open string, or (21+m) bits of same type (an exception PS). The following need to be clarified:

a. If any class starts before the (21+m) bit from last and extends into the last (21+m) bits of the IFDS, it is processed normally.

b. Anything within the last (21+m) bits of the IFDS, even if it is a class that would start and complete before the IFDS ends, is processed differently.

This different processing named above at b. is introduced next.

Since in the termination PS there is no restriction such as that imposed by the delimiter rule so that in the PS core there are only groups of 1, 2, and 3 same type bits, the termination PS can contain groups of any number of same type bits, from 1 to (21+m).

For every such group of "y" same type bits in the termination PS, the representation in the output will be (y−1) of 1 and 1 of 0.

Example 1: group of 1 same type bit (y=1). Representation is 0 (y−1) of 1 and 1 of 0, i.e. representation is bit 0.

Example 2: group of 14 same type bits (y=14). Representation is 13 (y−1) of 1 and 1 of 0, i.e. representation is 1111_1111_1111_1_0.

Always:

The last 0 from the representation of the bits of the termination PS in the output is dropped, since that last 0 is self understood, therefore redundant.

If the IFDS ends in the maximum applicable class (for example 18_4 for m=1 or 30_4 for m=13), the LB of that class is not necessary anymore, therefore will be dropped.

A termination PS does not have a specific class assignment, or RI. A termination PS is therefore left as is, and the hardware or software implementation of the encryption will recognize the termination PS being the last PS in the IFDS and based on the above described rules.

A very well defined set of primary root identifiers (RI) can be derived for this 28+m set of PS classes. As defined and discussed, primary RI are RI that are not transformed, i.e. they represent each and every class as is.

An example is provided for this discussion, in order to advance in the description of the disclosure.

For m=1, there are 29 classes of PS, as described above.

In accordance to the derivation of primary RI, as outlined above, these 29 classes have primary RI of class 4 to class 21. The total number of primary RI for all these 29 classes is 148. Each of the 18 primary RI classes (4 to 21) have a well-defined number of RI members. For example, class 4 has 5 RI members, class 5 has 10 RI members, class 6 has 12 RI members, and so on.

As discussed with reference to FIG. 8, the output can be described by two strings: the RI string, and the detail string. The RI string can be further processed by pairing consecutive RI.

Processing of multiple RI (such as three, or four) can be developed, and this is in no way limiting to the content presented in this disclosure, with the title of example or otherwise.

When pairing two consecutive RI, the resulting pair has in-between 8 and 42 bits.

For example:

Example 1 i. As mentioned, there are five primary RI of four bits (class 4 RI)

ii. If, in the output, there are two consecutive class 4 RI, they create an eight bit unique pair. Since there are five such class 4 RIs, the pair can have 25 possible alternatives.

Example 2 i. An RI pair that has ten bits, can be constituted by classes of RI 4-6, 5-5, or 6-4. The total number of such alternatives for an RI pair of 10 bits is 220.

Every RI pair of 8 to 42 bits will accordingly have a set number of alternatives, or members. For one pair, the number of such alternatives varies between minimum 16 (for pairs of 42 bits) and maximum 1276 (for pairs of 22 bits). The total number of pairs is, in this case of m=1, 21904.

Each of these 21904 pairs can be described, with an equivalent word that has an equal number of bits to the original.

For example, an 8 bit RI pair, that has 25 alternatives, can be described by 000_xxxxx, where xxxxx (five x) will cover the 25 alternatives. The seven remaining options (xxxxx has 32 positions) will be used as 14 positions for the nine bit RI pair.

Similar to the PS discussion, for these RI pairs, the following can be defined:

RI pair classes.

An RI pair class is a group of RI pairs that result in the same number of bits. For example, an RI pair that has 8 bits (resulting from pairing an RI of 4 bits with an RI of 4 bits), is called to be of class 8. An RI pair that has 10 bits, resulting from pairing RI of (first RI-second RI) 4-6, or 5-5, or 6-4 bits, is called to be of class 10. Each such RI pair class will have an equivalent description as described for class 8 (i.e. 000_xxxxx).

For m=1, there will be therefore 35 RI pair classes (from class 8 to class 42). As m increases, the number of RI pairs increases, leading to further encryption strength.

Each RI pair class has its own number of RI pairs. As mentioned above, for example, for m=1, class 8 has 25 pairs, class 10 has 220 pairs, class 22 has 1276 pairs, and class 42 has 16 pairs.

RI pair headers

Similarly to PS classes where core identifiers have been defined, for the RI pairs, the equivalent of core identifiers can be defined. For RI pairs, these core identifier equivalency are called headers, and are made of the first three bits in the equivalent description of an RI pair, i.e. from 000 to 111. Note that each header is common to multiple RI pair classes, and that is different from PS classes where each core identifier was specific to one class.

RI pair root identifiers (RI2)

The parallel between PS class RI and RI pair class RI is apparent at this point

For example, as mentioned, the class 8 RI pair is described by 000_xxxxx, where xxxxx (five x) will cover the 25 alternatives.

Similarly as done for the PS class RI, number 25 is described in term of primary binary numbers as 16+8+1.

That means that class 8 RI pair has three root identifiers, therefore, three RI2 can be defined for class 8 RI pair Second RI2 is a five bit RI2, namely 000_10, and represents 8 alternatives Third RI2 is an eight bit RI2, namely 000_11_000, and represents one alternative Putting together all RI2 from all RI pairs, 39 RI2 classes, from 4 to 42, with multiple members in each RI2 class, are formed As mentioned in the summary section, there are four encryption approaches that are disclosed. At this point, sufficient insight has been described in order to allow appropriate description of the four encryption approaches.

First encryption approach: The length of the partitioned PS represents an encryption choice.

This is done by choosing the value of variable m, greater or equal to 1 (as discussed with reference to FIG. 9 and FIG. 10). The maximum length of a partitioned PS is 22 bits (for m=1), 34 bits (for m=13), to any integer value (proportional to m, greater than 13).

Theoretically, there is no limit for m. Practically, m is limited by memory needs, as described. For demanding encryption applications where cost is secondary, large values for m can be chosen. The larger the value for m, the higher the encryption strength.

There are immense consequences from choosing the value of m. As described above, as m increases, the number of PS classes increase, the length of PS increases, the number of upper-class identifiers increases, the number of RI, RI2, and others, all increase, with immense consequences on increasing the encryption strength, encryption space, and the number of encryption keys, as described below.

Second encryption approach: Same PS and its derivatives (such as RI) can have a different encryption during one given cycle. There are three aspects here, leading to three encryption variables.

First encryption variable: The assignment of an ODC to an ICAC within every given PS class To exemplify, consider class 4_4, as detailed with reference to FIG. 4 and FIG. 7. As shown in FIG. 4, input PS of AB ICAC configuration 1_2_1_4 has an output correspondence ODC of 0100_010. This is only one possible assignment or correspondence ICAC-ODC. Any of the eight alternatives (see FIG. 4, column 404) can be assigned to the 1_2_1_4 ICAC. Every class has a number of ICAC—for example, for class 4_4 this number is seven. Globally, each class can be characterized by a number representing the total possible unique ICAC-ODC assignments for that class. This number is called CLIO (CLass Icac-Odc) in this document. For one class, CLIO is equal to the permutations of all ICAC-to-ODC assignments within that class.

For example, for class 4_4, there are seven ICAC-to-ODC assignments. CLIO for class 4_4 is equal to permutations of the seven ICAC-to-ODC assignments, which is 5,040. This number increases dramatically as the class order increases since the number of ICAC-to-ODC assignments increases. Further, here can be seen the significant impact that using a large m has CLIO increases dramatically as the class order increases (such as for class 18_4), because the larger the class order, the larger the number of ICAC in that class, the larger the number of ICAC-to-ODC assignments, and therefore the larger the number of permutations.

Further, as m increases, the number of classes increases, therefore, for those extra classes which are by definition high order classes, the number of ICAC is larger and larger as the class order increases, with the same consequences as described above.

Each class is independent in term of its own ICAC-to-ODC assignments and permutations, therefore, each class has its own characteristic CLIO number. Multiplying all the CLIO numbers for all classes, generates a global CLIO number characterizing the encryption space for this first encryption variable. This number is called GCLIO for the rest of this disclosure, and is not going to be detailed here, in this disclosure, because the calculations are too involved and are not relevant in term of disclosing new matter. The primary message relevant for this disclosure is that this number is extremely large (a first order ballpark number can be for example 10,000 multiplied 29 times with itself, where 29 is the number of classes, for m=1). Again, it can be seen the significant impact on this number that a larger m has.

A very important aspect needs to be outlined. As mentioned above, each class has a CLIO number. The impact on the encryption strength is that, considering the CLIO number as a PS encryption class space and the specific assignment used in one encryption cycle for a PS class as a PS class key, there are as many independent encryption keys as PS classes. For example, there are 29 independent encryption keys for m=1 and 41 encryption keys for m=13. Again, note the power that variable m gives on the encryption strength.

Second encryption variable: The assignment of core identifiers and RODC identifiers to a PS class Focusing on class 4_4 discussed above, any of the 16 core identifiers (see FIG. 7, column 721) can be assigned to class 4_4. Considering all 16 core identifiers, an additional encryption space is created, where this encryption space is equal to permutations of 16. This encryption space defines all possible core-identifier assignments specific to one given encryption cycle. This encryption space is called PCI (Permutations of Core Identifiers) for the rest of this disclosure.

Similarly to creating a PCI space, an encryption space can be created through permutations of the RODC. As mentioned, the RODC are used as identifiers for upper PS classes (class 15_4 and above). The number of RODC used for these upper classes is detailed with reference to FIG. 5, column 504 and the worth factor, column 505. Such an encryption space, when created, has two flavours:

Within the RODC used for one class. The upper classes use multiple RODC for one class as identifiers, compared to lower classes that use one core identifier for the entire class. Therefore, for the upper classes, an encryption space can be defined for every such upper class, by permutating the RODC used within that class and then multiplying those permutations for all upper classes to create a global variable.

Within the total RODC, groups of specific RODC are assigned for each upper class. Since each upper class requires a set, or group of RODC as identifiers, by varying such set assignments, an incommensurable encryption space is created. It must be noted that the size of this encryption space is implied as "incommensurable" by the large number of RODC and therefore the resulting number of possibilities to create said set assignments.

Third encryption variable: permutations of RI

As mentioned, the 29 PS classes (for m=1) have 148 RI, in 18 classes, with each class having a well-defined number of RI members. Within each of these classes of RI, permutations of the constituent RI members of that RI class can be performed, generating an encryption space.

Similarly to the discussion at CLIO above, there are 18 RI encryption keys, each with a variability factor equal to the permutations of the constituent RI within each class, and where these 18 variability factors are multiplied leading to a global RI variability factor (GRIF).

Totally, the variability factor of all three encryption variables discussed above can be named Global PS Alternatives, or GPSA, as used for the rest of this disclosure.

The GPSA number is a multiplication of GCLIO, PCI, and GRIF. The number coming from RODC permutations, called GRODC, can further multiply GPSA. GPSA is an extremely large number, and detailing such a number in this disclosure has no object. For the goal of this disclosure, it is sufficient to state that this extremely large number defines the encryption variability generated by the above disclosed components.

Totally, the space of the encryption keys of all aspects discussed above can be named as Global PS Keys, or GPSK, as used for the rest of this disclosure.

The GPSK number is a sum of CLIO encryption keys, RI encryption keys, to which the RODC encryption keys can be added.

Clearly, the strength of the disclosed encryption consists in the fact that such number of choices is possible, number of choice that represents a pool from which a select number of choices will be used. Even in the lowest encryption strength (m=1), the disclosed encryption can have so much overwhelming variability that can be used.

Third encryption approach: Two adjacent PS and their derivatives can be paired and have a different encryption during one given cycle. There are three aspects here, leading to three encryption variables.

First encryption variable: member assignment within an RI pair class

As described, for m=1 (the lowest encryption strength), when pairing two consecutive RI, 35 RI pair classes (8 to 42) are formed, each class having between 16 and 1276 members.

Similar to the first encryption variable at the second encryption approach, every member within an RI pair class can have a different assignment within that pair. Permutations of these members assignment within each class will create an encryption space for each RI pair class, called, for the rest of this disclosure, CRIPA (Class RI pair assignment).

For example, class 8 RI pair has 25 members, as described. The CRIPA number for class 8 RI pair is permutations of 25. Note that this class is one of the classes with the lowest number of members; for example, class 22 RI pair has 1276 members, therefore the CRIPA number for class 22 RI pair is permutations of 1276.

Multiplying the CRIPA numbers for all 35 RI pair classes, will result in a global encryption space for this first encryption variable, where this global encryption space is characterized by a number, called TRIPA (Total RI pair assignment) for the rest of this disclosure.

Similar to the discussion at first encryption variable at the second encryption approach, every RI pair class represents an independent encryption key, so, for the lowest encryption strength (m=1) there are 35 independent encryption keys (8 to 42). The number of such independent encryption keys increases strongly with m (in accordance to the number of RI pair dependence on the number of PS classes, respectively on the number of m, as detailed).

Second encryption variable: RI pair header permutations

As exemplified above, class 4 RI pair is described in the format 000_xxxxx. The 000_prefix is the equivalent of a core identifier as defined for PS classes. This prefix is called a header for RI pair classes. There are eight such headers (000_ to 111_), which, when permutated, create an encryption space called RIHP (RI pair header permutations). The characteristic number associated to RIHP is permutations of 8.

The third encryption variable: permutations of RI2

As described, pairing RI lead to 39 RI2 classes (from 4 to 42), where each of these classes has a number of members. Within each of these classes of RI2, permutations of the constituent RI2 members of that RI2 class can be performed, generating an encryption space.

Similarly to the discussion at RI above, there are 39 RI2 encryption keys, each with a variability factor equal to the permutations of the constituent RI2 within each class, and where these 39 variability factors are multiplied leading to a global RI2 variability factor (GRI2F).

Totally, the variability factor of all three encryption variables discussed above can be named Global RI pair Alternatives, or GRIPA, as used for the rest of this disclosure.

The GRIPA number is a multiplication of TRIPA, RIHP, and GRI2F. GRIPA is an extremely large number. For the goal of this disclosure, it is sufficient to state that this extremely large number defines the encryption variability generated by the above disclosed components.

Totally, the space of the encryption keys of all aspects discussed above can be named as Global RI pair Keys, or GRIK, as used for the rest of this disclosure.

The GRIK number is a sum of RI pair encryption keys and RI2 encryption keys.

Clearly, the strength of the disclosed encryption consists in the fact that such number of choices is possible, number of choice that represents a pool from which a select number of choices will be used. Even in the lowest encryption strength (m=1), the disclosed encryption can have so much overwhelming variability that can be used.

Fourth encryption approach: An encryption cycle can be repeated unlimited times.

The above GPSA and GRIPA numbers are multiplied to give the global number of encryption alternatives for one cycle, number also referred to as GNAC for the rest of this disclosure.

The above GPKA and GRIK are added to give the global number of encryption keys for one cycle, number also referred to as GKC for the rest of this disclosure.

As shown, GNAC and GKC depend on m.

First encryption approach defines the impact of m on the encryption strength, second and third encryption approach defines the GPSA respectively GRIPA encryption spaces and GPKA respectively GRIK encryption keys where all GPSA, GRIPA, GPKA and GRIK are influenced by m.

The fourth encryption approach acts as follows:

As mentioned, any number of encryption cycles can be applied.

Every cycle generates a GNAC and a GKC. Every cycle can have a different m.

If for example there are three encryption cycles being engaged, and each encryption cycle generates GNAC_1, GNAC_2, GNAC_3, and GKC_1, GKC_2, and GKC_3, then two final numbers are generated, characterizing the total encryption strength:

Final encryption strength number, or FESN, which is equal to the sum of GNAC generated by each cycle, i.e. GNAC_1+GNAC_2+GNAC_3.

Final encryption key number, or FEKN, which is equal to the sum of GKC generated by each cycle, i.e. GKC_1+GKC_2+GKC_3.

FESN and FEKN represent the available encryption space for the disclosed DED. Any encryption within this space maintains the size of the encrypted file to be the same as the original file size.

In order to perform any encryption within the FESN/FEKN space, the following need to be specified:

a. Variable m
b. One global, PS alternative choice within the number of GPSA/GPKA space
c. One global RI pair alternative choice within the number of GRIPA/GRIK space
d. Number of cycles All these form a binary word. Given the very large number of alternatives in the spaces at b and c above, this binary word can be in the thousands of bits, if all alternatives in the two spaces are desired to be represented. Applications, users, or devices can have a set of these binary words for use, and these can be sequentially referred to with a lower number of bits. For example, one application/user/device can have say 128 binary words from the full space (each binary word say of 32768 bits), and the respective application/user/device can call any of the 128 binary words of 32768 bits each with only 7 bits. Note that the encryption space remains untouched—the said lower number of bits to represent said set of binary words in use only refers to how much of the full space is desired to be used in a given application/user/device. The encryption strength remains the same, because a third party would not know what the 128 binary words in use are, but more on this is disclosed below. Note that the set of binary words in use can also be adaptive and be changed using a specific method that may include a deterministic measure such as the date and time of use, as also disclosed below.

A binary word in use is called in this disclosure a global encryption key (GEK). GEK should not be confused to GPKA, GRIK, GKC, or FEKN, as indicated very clearly by their definitions.

The DED method disclosed here can be implemented in software or in hardware. There are two main differences of focus between the hardware and software implementations, the first one being the memory needs and the second one being the security level of a communication between a sender and a receiver.

Regarding the first difference, the memory needs. An example is being considered, to make the point.

- As described for the first encryption variable of the second encryption approach, for class 4_4, there are seven ICAC-to-ODC assignments. CLIO for class 4_4 is equal to permutations of the seven ICAC-to-ODC assignments, which is 5,040. To cover this, in a classic direct approach, 5,040 memory locations of 22 bits each would be required. The 22 bit specification represents the maximum word size for a PS class allocation, as explained, and this maximum size is used for all PS classes.
- As mentioned above, the above described encryption space and memory need is just for one key out of the total GKC keys in one encryption cycle. If all keys in the GKC space would be implemented classic, the memory needs would exceed the doable limits at present time in a hardware implementation, and would be possible, but challenging in a software implementation. A solution for such classic implementation is to limit the GKC space within one application or user or device, and in this case, the implementation becomes challenging for a hardware implementation and perfectly doable for a software implementation.
- In this disclosure however, a solution that makes both hardware and software implementations perfectly doable from the memory needs point of view while covering the entire encryption space in every application/user/device, is disclosed next.

Regarding the second difference, the security level of a communication between a sender and a receiver.

- As will be disclosed next, a hardware implementation is more secure than a software implementation, but using the disclosed embodiments, both hardware and software implementations reach a high security level.

The solution mentioned above for the first difference, namely to make both hardware and software implementations perfectly doable from the memory needs point of view while covering the entire practically unlimited encryption variability space in every application/user/device, is disclosed next. The hardware implementation is detailed, and then parallel to the software implementation is made. An example is provided to exemplify this disclosed solution.

- The hardware implementation will not consist only of memory to store all the variability in the encryption space, to cover all the encryption space described above—such amount of memory is not doable. Instead, the hardware implementation will consist of memory and a specialized controller.
  - The memory will contain only the standard allocation for PS, RI, RI pair, RI2, and other encryption spaces and keys described above. Standard allocation equates to the basic, non-permutated assignments for each of the above, as described. As outlined across the disclosure, for m=1, the necessary memory is less than 500 k in total (with different word length for PS, RI, RI pair, RI2, or other). For m=13, the necessary memory increases to about 500M. Solutions to the memory requirements exist for m larger than 13, solutions that may imply a larger cost, or a slower speed, solutions that may employ off-chip memory.
  - The specialised controller will derive the PS, RI, RI pair, RI2 and other allocation that corresponds to the GEK encryption key that is currently in use, by using as reference the standard allocation that is stored in the memory described above. For example:
    - As described for the first encryption variable of the second encryption approach, for class 4_4, there are seven ICAC-to-ODC assignments. CLIO for class 4_4 is equal to permutations of the seven ICAC-to-ODC assignments, which is 5,040. To cover this, in a memory-only implementation, 5,040 memory locations of 22 bits each would be required. The 22 bit specification represents the maximum word size for a PS class allocation, as explained, and this maximum size is used for all PS classes.
    - By specifying in the GEK which permutation of seven ICAC-to-ODC is used in the current encryption cycle, the 5,040 memory locations can be saved, as follows:
      - The specialised controller mentioned above will read the information pertaining to which permutation is used in the current encryption cycle from GEK. This information can be represented by a 13 bits word, to cover the 5,040 space.
      - The specialised controller then will read from the standard memory, the seven standard allocation words of 22 bits each.
      - Out of these seven words and the 13 bit word, the specialised processor will create the corresponding seven word assignment corresponding to the permutation being used in the current cycle.

The seven word assignment that has been determined by the specialized controller, is written in an operational memory, operational memory that is used to encrypt the IFDS for the current cycle.

The GEK encryption key for the current cycle similarly has a binary word (similar as the 13 bit word described above) for every PS class, RI class, RI pair class, RI2 class, and other encryption variables described above.

These binary words will have appropriate size function of which encryption variable needs to be covered. For example, a much larger number of bits will be needed to cover which permutation is in use out of the permutations of 1276 necessary for class 22 RI encryption space. But this is perfectly doable and represents no issue.

The specialized controller will read and interpret each and every of these binary words for all the above described encryption key spaces that are assembled in the GEK encryption key, and write the full operational memory that represents the GEK encryption key. This operational memory will have sections for each of the encryption key spaces described above.

Accordingly, an operational memory of the size equal to the original standard allocation memory is created by the specialised controller, by interpreting the GEK key.

Consequently, full coverage of the entire encryption space is possible, with the cost of only two standard allocation memory spaces and a specialized controller.

The penalty is the time that the specialized controller takes to interpret the GEK key and to create the operational memory, which is a RAM memory, as compared to a ROM memory for the standard allocation memory that is used as reference. This penalty is a one-time event per encryption cycle, no matter how big the IFDS that is being encrypted is.

It must be noted that this penalty time is visible to a user only for the first encryption cycle, or the first IFDS if the data stream contains multiple IFDS. That is because once a GEK encryption key is decoded and the operational memory is created, the encryption of the IFDS is performed using the created operational memory. In the time when the encryption of the IFDS is performed, the next GEK encryption key is decoded and the next operational memory is created by the specialized controller, and this processed is not visible to the user, being a parallel processor to the visible IFDS encryption process.

Finally, it must be noted that this solution disclosed here, will require therefore a specialized controller with the function as described above, a ROM memory for the standard allocation as described, and two RAM operational memories of the same size as the standard allocation ROM memory, where the said size of the memory depends on variable m.

The solution mentioned above for the second difference, namely to make both hardware and software implementations reach a high security level of a communication between a sender and a receiver, is disclosed next. The hardware implementation is detailed, and then parallel to the software implementation is made. An example is provided to exemplify this disclosed solution.

The challenge for the hardware implementation is how to preserve the highest level of security. In other words, this means how to communicate the encryption keys (GEK) between the sender and the receiver, so that the receiver is able to decrypt the information encrypted by the sender. This is essential, because the GEK keys are dynamic, and if the GEK keys are sent over the communication channel, even if they are sent encrypted, this would represent a security risk. The practical implementation, disclosure here, is as follows:

1 Every chip, or device, will have a unique ID, from the factory. This unique ID is public, i.e. is communicated as part of the communication protocol between the two devices involved in the communication (i.e. the receiver and the sender), at the start of the communication.

2 From the factory, each device has, hardwired, what is the template of the encryption protocol and sequence that is going to be used between that device only and every other device, function of that other device ID.

a. This hardwired encryption protocol and sequence represents a sequence of GEK keys.

b. The only possibility for a security breach to be successful is to have the hardwired specifics for the two specific devices engaged in the communication, in addition to the receiver ID and the sender ID, in order to intercept the communication. Since the sender and the receiver ID is communicated on the communication channel, a successful security breach must have the hardwired content defining the communication between the two devices engaged in communication—and this information is only available from the chip manufacturer, or from the two devices involved in communication. Obviously, a third party trying to breach in would not have the two devices to have the hardwired content, therefore the only way to have that content is from the chip manufacturer. More on this below.

3 Variations on this approach are possible, such as the sender and the receiver may know each other's device ID, therefore these are not transmitted anymore through the communication channel, adding an additional lever to the security.

4 Other enhancements are possible, such as:

a. Use of additional security keys, encrypted or not, but all these would require transmission or communication between sender and receiver, directly on the communication channel or indirectly through other means. These, theoretically, can be intercepted, so, for high security applications this may not be the best option to use. Of course, since the hardwired hardware specifics of the two devices are not available, intercepting these additional security keys will not imply a breach, but since these additional security keys can be intercepted, these additional security keys would not bring a major advantage either.

b. Another possible enhancement can be that the hardwired specifics are skewed, or altered, by deterministic non-transmissible information, such as the communication date/time, outside temperature, information that can be determined by both devices engaged in the communication, information that has enough variability that will prevent a third party to timely determine it.

c. Further, such deterministic information can be uniquely processed to create a skewed encryption key to alter the hardwired specifics, where this unique process applied to the deterministic information to generate the skewed encryption key is similarly hardwired to be unique between specific two devices. This is useful, because it permits to vary the encryption keys between two devices as a function for example of the time that the communication takes place at.

d. Concluding, the practical implementation, proposed above, has as the only possible security breach to have the hardware specifics for two very specific devices from the chip manufacturer. Since a third party that would want to breach a communication would not know apriori which is the device IDs of the two devices engaged in the communication of interest, it means that this third party must have the hardware specifics for all devices that were manufactured by the chip manufacturer. While compromising the chip manufacturer and obtaining such information is possible, such an event is highly unlikely, and in addition, an event of such magnitude would be known by all users that their communication may be compromised.

5 Additional observations:

a. The manufacturer implements the very specific encryption protocol and sequence of one device that is going to be used with another device only, as a template. This template will include, as mentioned, a sequence of GEK keys. This template is repeated for every communication, transmission, etc, between those two devices, unless a skewed encryption key is generated preferably as described at 4.c above, or more general is skewed with deterministic non-transmissible information, or with transmittable custom entries or security keys as also described.

b. The manufacturer can hardwire the above named protocol and sequence for devices that have been fabricated, but can hardwire this for devices that will be fabricated as well by generating IDs for devices that will be fabricated, in advance. Such hardwire can be implemented as a ROM, or even more secure, as a circuit. In case of a major event at the manufacturer as described at 4.d above, event that would compromise the security of devices, the manufacturer can recall the devices and update the ROM content.

c. If the number of fabricated devices exceeds the number of IDs that were predicted for future manufacture and hardwired in one device, for those devices for which an ID was not hardwired, a generic protocol and sequence will be used, warning the device owner. The keys for this generic protocol and sequence are still hardwired, so they are not transmitted on the communication channel, but since these are not device specific, the keys are less secure (easier to be determined by a security breach, since they are used for multiple devices).

d. Non-device specific keys are also used by one transmitter to multiple receivers, such as a TV station broadcasting encrypted to multiple subscribers.

e. Non-device specific keys can be used also by any transmitter to any receiver by default, in a regular, less secure communication, even when the respective transmitter and receiver have valid IDs. In between such devices, the more secure device-specific communication can be activated by the user, on demand.

f. As mentioned, the implementation means to hardwire all the said device specific keys can be for example in a device specific ROM.

Brief notes on the memory needs and security level aspects in a software implementation.

1 For the memory needs aspect, this is by no means an issue in a software implementation. The controller from the hardware implementation can be conveniently replicated in a software implementation, for an equivalent functionality.

2 For the security level, an equivalent software implementation to the hardware implementation can also be implemented.

a. Every software installation on every device will have an ID, which behaves similar to the hardware device ID b. The hardwired template of the encryption protocol and sequence between two unique, specific devices, will be part of the software package, and is unique to the software installation for that specific ID.

c. These two aspects will create an equivalent behaviour of the device on which this software installation resides. A breach will require the template of the encryption protocol and sequence that is specific for the specific device/installation, and this can be obtained, similarly from the software manufacturer. However, the fact that it can also be a software vendor involved, as well as the fact that software can be breached, would make a software implementation less desirable for high security applications as compared to a hardware implementation.

d. All other considerations for a software implementation are equivalent to the considerations detailed for the hardware implementation.

Comparing the two implementations, it is clear that a software implementation is much more convenient and lower cost for most applications, including consumer applications, while a hardware implementation is the best option for applications where security cannot be compromised with, such as for military applications or high security communications.

Figure 11:
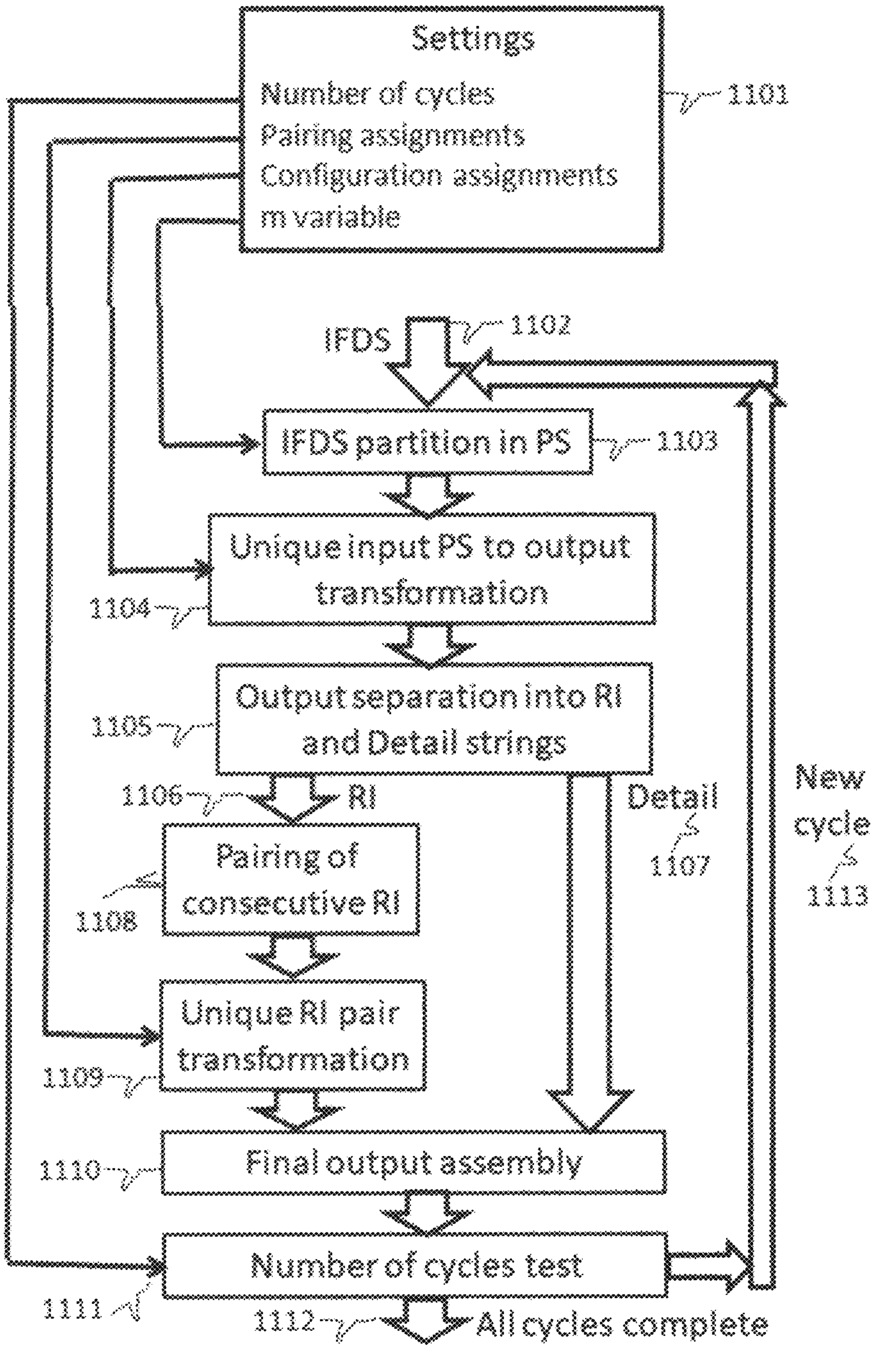
FIG. 11 is used to introduce, describe, and illustrate the flow, implementation, and suggested hardware architecture used for encryption, in accordance to one or more of the embodiments

In both cases, software or hardware, the encryption flow described in FIG. 11 applies. Next, notes applicable to both software and hardware implementations are outlined, with hardware specifics highlights. In both implementations, the settings, at 1101 in FIG. 11, are already derived as discussed above with hardware and software specifics. Essentially, the 1101 settings are derived by the specialized controller that decodes the GEK encryption key and writes the operational RAM memory. The GEK encryption keys correspond to the hardwired communication protocol between two specific devices engaged in the communication, as explained above. In the encryption flow described below, the derivation of the 1101 settings are considered complete, using a procedure as described above. Therefore, only the encryption flow of the IFDS is described next.

1 The input data string to be encrypted is outlined as 1102 a. For hardware implementation, this data is preferably received on a 32 bit data bus 2 The first encryption setting out of the 1101 settings to be used, is the m variable. This variable sets the maximum PS length, as detailed above. Based on m, the IFDS is partitioned in PS, at 1103.

a. In hardware implementation, this step is implemented using a specialized controller 3 Every PS is transformed into a unique corresponding output at 1104, using the second encryption setting, the configuration assignments.

a. In hardware, this transformation is performed using the corresponding part of the operational memory derived after the decoding of the GEK encryption key, where the PS is the address, and the memory output corresponding to that address is the unique corresponding output. This operation is performed by a specified controller.

4 The encrypted output from 1104 is divided into RI (1106) and Detail (1107) strings at 1105. Consecutive RI are paired at 1108.

a. All these steps are implemented in hardware using a specialized controller.

5 Every pair of consecutive RI is transformed at 1109, using the third encryption setting, the pairing assignments.

a. The highlights here are similar to the PS transformation highlights at 1104. This part of the flow is using another part of the operational memory, derived after the decode of the GEK encryption key, where this part of the operational memory details the RI pair and RI2 assignments.

6 The encrypted RI pairs together with the original corresponding details are assembled at 1110. The preferred assembling is that each encrypted pair is followed by the corresponding details of the two RIs in the pair.

a. In term of hardware, this assembly is implemented through a specialized controller.

7 The number of completed cycles is compared to the number of cycles in the encryption settings (the last of the four encryption settings), at 1111.

a. If the comparison generates a true value, the final data is ousted at 1112.

b. If the comparison generates a false value, a new cycle starts, by returning the output encrypted data from the current cycle, on path 1113, to the input.

c. The new cycle may implement a full set of settings specified again at 1101. It may also implement a partial set of settings, such as only the pairing assignments may change from the previous cycle. In any case, as explained, a new operational memory is used after being derived for the new cycle, as explained above.

d. In hardware, this is implemented by a specialized controller.

8 As mentioned, the GEK encryption keys used for the encryption cycle(s) are not transmitted over the communication channel. They are part of the hardwired security settings of the communication between two devices, as explained.

Figure 12:
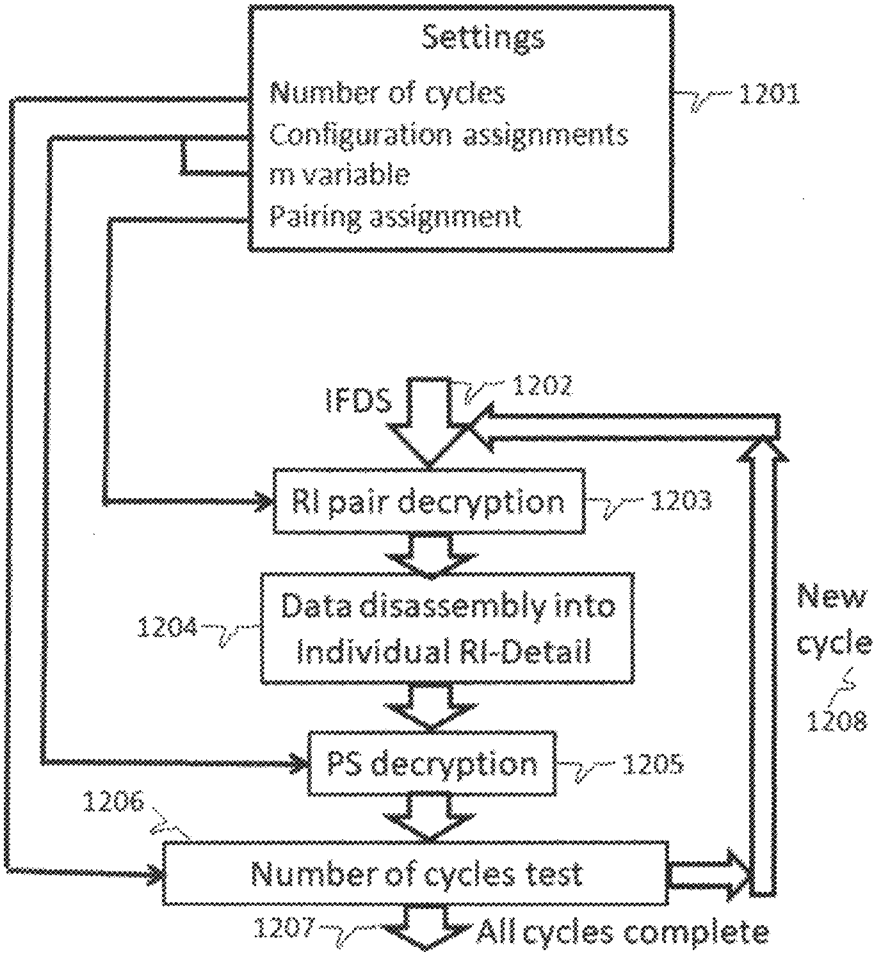
FIG. 12 is used to introduce, describe, and illustrate the flow, implementation, and suggested hardware architecture used for decryption, in accordance to one or more of the embodiments

The decryption flow and hardware implementation, depicted in FIG. 12, is dual to the encryption flow and hardware implementation.

1 The receiver device has the protocol to communicate to a specific sender device hardwired, as detailed above. In other words, the received decodes the GEK keys used by the sender, in order to perform the decryption, and writes the operational memory in 1201. All these processes and steps have been already detailed above.

2 The fully encrypted data is received at 1202. The first priority to decrypt the received data is to recognize the encrypted RI pairs (RI2 first, then RI pairs). In order to fulfil this task, a multitude of settings (not shown in FIG. 12 in order to keep the figure legible) are required:

a. Variable m is required because it will indicate how many PS classes, therefore how many RI exist b. Configuration assignments are required, in order to indicate the meaning of each RI c. Pairing assignments are required, to indicate the content of each pair i. In hardware, the a, b, c, settings above are interpreted by a controller.

3 Using the a, b, and c above, the decryption of the RI2 and RI pair, at 1203, is performed using the corresponding part of the derived operational memory over the written structure of the encrypted data (RI pair followed by detail).

a. Since it is known therefore that the first thing in the encrypted string is an encrypted RI2/RI pair, and since every encrypted RI2/RI pair is unique given the data at a, b, and c above, the encrypted RI2/RI pair is separated from the string and decrypted.

i. In hardware, this separation is implemented by a specialized controller. The decryption, as mentioned, is performed using the corresponding part of the operational memory, where the memory address is the encrypted RI2/RI pair together with the m variable and select PS encryption assignment flags, and the memory output is the decrypted RI2/RI pair (i.e., the two RI).

4 The decrypted RI2/RI pair will provide the two constituent RI. Each RI will indicate the number of corresponding bits in the Detail section, therefore Detail is separated from the string for the two RI, and the two encrypted PS are obtained, at 1204.

a. In hardware, all this is implemented by a specialized controller.

5 The two PS are decrypted at 1205 using two settings: the m variable and the Configuration assignments.

a. In hardware, this is implemented, similarly to the RI2/RI pair decryption, using a corresponding part of the operational memory, where the memory address is the encrypted PS together with the m variable, and the memory output is the raw input PS.

6 The number of cycles that are completed is compared to the number of cycles in the settings at 1206. If the comparison generates a true value, the final decrypted data is output for use at 1207. If the comparison generates a false value, a new decryption cycle is started by returning the decrypted data from the current cycle, on path 1208, to the input. The new cycle will use, again, the same settings that were used for the encryption based on a new, cycle specific operational memory, as explained above.

a. In hardware, this is implemented by a specialized controller.

Note that applying an RB transformation to the entire IFDS before the above described processing represents yet another encryption variable, since an RB transformation completely changes the IFDS therefore the encryption outcome. Such RB transformation can be applied for every encryption cycle.

Another important note: the disclosed encryption/decryption method keeps the file size constant in all conditions and for all operations that have been disclosed. Keeping the file size constant is not limiting in any way to the disclosed aspects, i.e. the file size can be compressed or expanded before or during the encryption/decryption process. The key aspect and condition when a compression or expansion of data is performed is that this process of expansion compression preserves the uniqueness correspondence of the data so that the decryption uniquely restores encryption process to the initial data.

The applications of the disclosed DED method, when is implemented either as hardware or software, are countless. Some examples are provided just to outline the possibilities:

1 Secure audio and video communication, wired and wireless
2 Secure audio and video broadcast
3 "Pay per view" audio and video broadcast
4 Secure data communication
5 Secure data storage From reading the present disclosure, other variations and modifications will be apparent to the skilled person. Such variations and modifications may involve equivalent and other features which are already known in the art or are implied by the embodiments presented in this disclosure. Such variations and modifications may increase the performance of the DED method.

Conversely, it should be noted that the examples presented in the disclosure are in no way limiting, and the skilled person will appreciate that the disclosure is equally applicable to multiple variations, alternatives, and extensions, and multiple optimizations are possible. Some such variations, alternatives, extensions and optimizations are outlined below with a title of example, with more apparent to a skilled person in the field.

1. Across the specification, multiple encryption possibilities are detailed or implied, such as:
   Choice of variable m.
   Permutations of the members of a PS class.
   Permutations of ICAC-to-ODC members of a PS class
   Permutations of core identifiers.
   Permutations of RI members of an RI class.
   Permutations of "detail" members of a PS class.
   Permutations of RI members of a PS class
   Permutations of RI pair members of an RI pair class
   Permutations of RI pair headers.
   Permutations of RI2 members of an RI2 class
   Permutations of RI2 members of an RI pair class
   Permutations of "alternative" members of an RI pair class
   Repeat of multiple encryption cycles These encryption possibilities, exhaustively, can generate up to ten levels of encryption hierarchy, defined as where the current encryption level uses the encrypted result of the previous level (such as permutations of ICAC-to-ODC is the current level and permutations of the members of a PS class is the previous level). In addition, a tremendous amount of encryption variability can be created, as a function of what combination of these encryption possibilities and of these encryption levels one would choose during an encryption process. The attached claims therefore only provide examples of the above, because there would be impractical to cover all such options and combinations, therefore, the examples provided are in no way limiting to the possibilities and extensions expressed or implied in/by this disclosure.

2. The example detailed across the specification is based on the most direct example by which the minimum number of bits that can be encrypted consists of the number of bits of two consecutive PS. That is because the disclosure details the creation of pairs, such as when RI pairs are created, the RI of two consecutive PS are considered. In addition, since the encryption process is a serial process, the specification details that the "horizon" needed to encrypt is two PS, i.e., every two consecutive PS an encryption result can be written in the output file, making the encryption process extremely fast.

An immediate extension is to consider for encryption groups of consecutive PS (such as groups of ten consecutive PS), where any two PS in this group can be paired to create the pairs (for example PS #1 with PS #10 makes the first pair, PS #2 with PS #3 makes the second pair, PS #4 with PS #7 makes the third pair, PS #5 with PS #9 makes the fourth pair, and PS #5 with PS #8 makes the fifth pair in the group of ten). Such group of consecutive PS is called a pairing range, and the scheme in which the pairs are created within this pairing range is specified by a number of bits, creating an additional encryption level. The "horizon" for which encrypted data is written in the output file becomes that of the size of the pairing range (the number of bits of the ten PS pairing range in this example).

Note that the even number of PS in the pairing range can be of a fixed number, or can be custom specified by a user, such as by device 1 when device 1 and device 2 exchange encrypted data. The specification of the even number of PS in the pairing range and of how the pairs are created in that pairing range can be done using a number of bits, that can be part of a larger group of bits customizing the encryption/decryption, called option bits. These option bits can be part of the encryption/decryption key, but that is not preferred because it would increase the size of the KM. The preferred implementation is to have a dedicated options memory (OPM), where every unique device-to-device communication (such as D1-D2) is assigned a specific configuration of the options bits. Note that multiple device-to-device may have the same options assigned—for example, in the example of 10 million users and 1 million option possibilities (20 bits), there will be 10 device-to-device unique communications to have the same options). If there are 30 bit option words, there are no devices sharing same options.

3. The example detailed across the specification is based on the immediate disclosed case where the set of PS and therefore all other derived sets such as the RI set uses a delimiter (DE) of four bits. As discussed, the DE can be any size, such as three or five bits, which changes all the sets and therefore changes the encryption space. A larger DE size will generate a larger encryption space.

In addition, essential for the disclosure is that the structure of a set of PS and all other sets and binary constructs derived from this set and outlined across the specification are derived and exemplified, because a person skilled in the art can immediately replicate similar set and sets/binary constructs with clearly no merit in term of new matter. An example of such a replica:

An input data string is partitioned in a set of strings that start with any combination of four bits (from 0000 to 1111).

The set of strings can be all of the same number of bits (such as all of 10 bits) or can be the size of the disclosed PS classes (from 4 to 22 bits for m=1). This maximum number of bits of a PS in the set of strings can be varied in accordance to a replica variable (the replica of variable m), with the replica loosing the meaning of variable m as disclosed.

The input to output transformation of one such string would not have a meaningful correspondence, as disclosed for PS, but in order to change the structure of an input data string from one encryption cycle to another, a replica of the transformation can be simply by permutating the combinations of the four bits with which each string starts.

Once the set of strings is defined, replicas of RI, RI pair, etc. sets can be formulated to match the disclosed RI, RI pair, etc. sets, or replicas that will generate a different composition and distribution as compared to the disclosed sets.

Note that the meaning of the PS, RI, RI pair individuals and sets is not the same in the replicas as in the disclosed—for example, the PS structure and composition of a PS in the disclosed is based on the occurrence of a delimiter.

4. The example discussed in the specification considers the encryption of the entire IFDS using the same encryption conditions captured in one encryption key. While that is the most common practical situation, an immediate extension is the following:

The IFDS is divided in consecutive segments, called slices, with each slice receiving a consecutive number in ascending order.

Each slice is encrypted using different encryption conditions, i.e. different encryption keys.

Each encrypted slice is then concatenated in the same order, in accordance to the received consecutive numbers, obtaining the encrypted output for the full IFDS, encrypted output which carries multiple encryption keys, one for every constituent slice. An alternate order to concatenate the slices and create the encrypted output of the full IFDS is by permutating the consecutive order numbers received by the slices and assembling the slices in this permutated order. In this case, the permutated order will be specified by an additional number of bits, similarly as at (2) above, part of a group of bits called option bits.

The size of the slices can be of a fixed size, or it can be customized by a user, providing additional encryption strength. The customized size can also be specified using a number of bits added as part of the option bits.

5. The example disclosed across the specification detailing how to preserve the highest level of security when two devices communicate to each other, comprise of sharing device IDs and storing in a dedicated encryption key memory encryption/decryption keys dedicated to those device IDs. As described above, the "device ID" terminology covers both hardware and software implementations, so, a more generic terminology can also be referred as "implementation ID". Based on the device (or implementation) IDs, the encryption/decryption keys that are specifically dedicated only to those device IDs to encrypt/decrypt data, are retrieved. The key aspect here is that the two device IDs of the two devices that communicate are shared on a public channel. While sharing the device IDs is not an issue for security since the encryption keys are not shared, and the encrypted data therefore cannot be intercepted, sharing device IDs may not be desired because it would disclose the communicating devices on a public channel. To minimize this drawback and further increase the communication security, an extension is further disclosed next when only one device ID is sufficient to be shared. The extension is as follows:

As discussed, the disclosed encryption space exceeds 2 to the several thousands, i.e. an encryption key is more than several thousands of bits in size, also known as the total number of bits of an encryption/decryption key, or total encryption space. Accordingly, only a small percentage of this encryption space will ever be used. To discuss based on a realistic example, consider a network of 10 million users/devices. The total number of encryption/decryption keys, for all devices, that are needed to have one key dedicated to communicate between any two devices is $5*10^{13}$. A number of bits of 49 bits is sufficient to describe, or identify all these keys. If the total encryption space is described only with 1,000 bits, only 5% of this space is used for the network of 10 million devices in this example—the actual percentage is much lower because the encryption space is much larger.

In this example, $5*10^{13}$ is the total number of encryption keys for all 10 million devices, but each device has in its encryption key memory (KM) 10 million keys to communicate with every other device, in dedicated mode. The 10 million keys are different for every device, for example, for device 1, the keys are to communicate between D1 (device 1) to D2 (device 2), i.e. D1-D2, D1-D3, D1-D4, D1-D (10 million), for device 2, the keys are to communicate between D2-D1, D2-D3, D2-D4, D2-D (10 million), for device 3, the keys are to communicate between D3-D1, D3-D2, D3-D4, D3-D (10 million), and so on. Keys D1-D2 and D2-D1 for example, are the same in this discussion, but they can be different.

If each encryption key is 1000 bits wide, then the total KM memory space, required in every device, is 10 Gbits (to cover the 10 million device network). The 10 million keys are accessed using a 24 bit address, also known as identification bits of an encryption/decryption key.

When a first device is encrypting data for a second device, the encryption process starts with the second device communicating its device ID to the first device. Once the first device receives the device ID for the second device, it retrieves from its encryption key memory the encryption/decryption key that is dedicated to communicate encrypted with the second device, and encrypts the data using this encryption/decryption key. In addition, it also retrieves the 24 bit address in the encryption key memory corresponding to this encryption/decryption key, i.e. the identification bits of the key. In the discussed example, upon receiving the device ID for the second device D2, it retrieves the D1-D2 key, and encrypts the data using this key. Then it attaches the address of the D1-D2 key in 24 bit format.

The first device communicates to the second device the encrypted data encrypted using the encryption/decryption key that corresponds to the device ID of the second device, as well as the 24 bit memory location of this encryption/decryption key in the encryption key memory of the first device.

When the second device receives this encrypted data, first it retrieves the 24 bit address. In the encryption key memory of the second device, at the same 24 bit address as in the first device, the same encryption/decryption key is written. Therefore, the second device, using the retrieved 24 bit address, retrieves from its encryption memory the encryption/decryption key that the first device used to encrypt the data, i.e. D1-D2, and decrypts the data.

Note that only the second device needs to share its device ID on the public channel.

Figure 13:
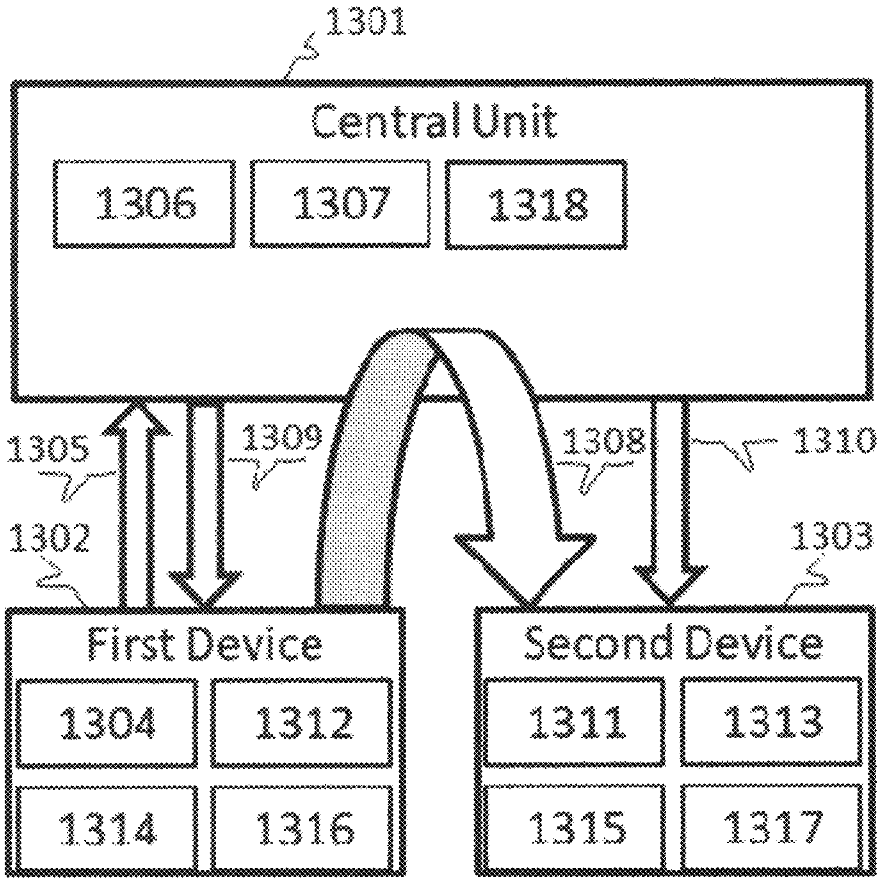
FIG. 13 is used to introduce, describe, and illustrate the elements and flow of signalling and of data between two communicating devices, in order to provide a high level of data security, in accordance to one or more of the embodiments

6. A further extension is when no device ID is shared publicly on the communication channel, as follows. Reference to FIG. 13 is made. The new element here is that the network provider implements a switchboard, also known as a central unit (CU), 1301 in FIG. 13, with the functionality described below. A telephone-based communication example is provided, with similarity to any other type of communicating device.

Consider two devices, Device 1 (or First Device, 1302 in FIG. 13) and Device 2 (or Second Device, 1303 in FIG. 13), where in the discussed example sequence Device 1 encrypts data for Device 2. There are 10 million devices in the network, representing 10 million subscribers.

When a subscriber subscribes, it receives a device that has a chip incorporated (hardware implementation) or a software package is downloaded on a generic device (software implementation), as outlined across the specification. In both cases, the device receives a device ID, also known as implementation ID. At the same time, the subscriber receives a public address, such as a telephone number. As detailed above across the specification, all encryption keys are already hardcoded in the hardware/software implementation-during the subscribing process, the correspondence between these keys and the device ID is made. For example, say that subscriber number 1000 subscribes. The device ID for this subscriber will be D1000. In the keys memory (KM) of Device 1 (1304 in FIG. 13), the number 1000 memory location (address number 1000) will be assigned for communication between D1-D1000. The other keys at memory locations 1001 to 10 million will exist in the keys memory but are not assigned yet because there are only 1000 subscribers at this time. Of course, the device ID does not have to be in the subscriber order—it may be in random order.

Due to the random nature of the subscribing process, only the network switchboard (CU) knows the correspondence between a public address (telephone number) and a device ID, and this is dynamically updated, at subscription, in the correspondence memory (CM) shown as 1318 in FIG. 13. Note that such public address is only transferrable to a different device by the network, CU, so that a new correspondence between the public address and the new device ID is made in CM.

When device 1 (D1) initiates a communication with device 2 (D2), D1 dials a switchboard address (such as a 1-800 number) and sends to the switchboard a request for communication with D2 (depicted as 1305 in FIG. 13). This request is encrypted using a dedicated key between D1 and switchboard (D1-S). Each of the 10 million devices have such a dedicated key, D2-S, . . . . D (10 million)-S, stored in the key memory KM. This encrypted request for communication contains two fields: the "From" field which is the phone number of D1, and the "To" field which is the phone number of D2. Sending this request for communication encrypted using a dedicated key is a security measure, for two main aspects:

Any party intending to read the content of the request for communication (the two phone numbers), requires the D1-S key.

If for example the SIM card with the phone number for D1 is moved to a different device, the D1-S key will be different in the different device to which the SIM card was moved, and therefore the encryption of the request for communication is not matching to the switchboard decryption (such as the encrypted "From" D1 phone number will not match to the "SIM" phone number that the switchboard will see from the 1-800 call).

The switchboard has a special "request for communication memory", or RCM (1306 in FIG. 13), where, based on the device ID to phone number correspondence that the switchboard assigns, stores all the device-to-switchboard (Dx-S, such as D1-S) encryption keys of all subscribers. Note that this is a dynamic memory that is updated with every new subscriber. The switchboard performs all the operations described here by a Specialized Processing Unit (SPU), shown as 1307 in FIG. 13.

When a request for communication is received by the switchboard on the 1-800 number, the switchboard SPU will see the phone number in clear where this request is coming from (such as the D1 phone number). From the RCM memory, the SPU will retrieve the D1-S encryption/decryption key, and with this key, will decrypt the request for communication, and check if the decrypted "From" field is the same as the D1 phone number in clear. If the check fails, it flags a breach. If the check passes, then, based on the retrieved D1 and D2 phone numbers, creates a direct communication link between D1 and D2 (shown as 1308 in FIG. 13), as requested by D1 in the encrypted request for communication. The switchboard SPU informs the two parties, D1 and D2, that the communication channel is established, by sending two encrypted messages to D1 and D2 (shown as 1309 and 1310 in FIG. 13), by using encrypted D1-S and D2-S keys. The encrypted communication messages to D1 and D2 include the implementation IDs of the two devices, as retrieved from CM based on the two phone numbers specified in the request for communication from device 1. Note that only the CU knows this correspondence between the phone numbers and implementation IDs, therefore note the importance and the additional security that this communication with CU provides.

Once the direct link between D1 and D2 is established by the switchboard SPU, D1 and D2 communicates using encrypted data based on the encryption/decryption key D1-D2, similar as at (5) above. The direct link 1308 between D1 and D2 is bidirectional in real life (depicted in FIG. 13 only from D1 to D2 because that is what is being discussed in detail in this example).

For completeness, In FIG. 13, the key memory for Device 2 is shown as 1311, the standard allocation memory SAM for Device 1 and 2 are shown as 1312 and 1313 respectively, the operational memory OM for device 1 and 2 are shown as 1314 and 1315, and the specialized controller for device 1 and 2 are shown as 1316 and 1317.

Note that the switchboard only sees between which two devices (or subscribers) a communication is made. The switchboard cannot read the communicated data between D1 and D2 (it does not have the D1-D2 dedicated key). Nobody besides the switchboard can see between which two devices a communication occurs, nor what the communication consists of. A third party would be able to see that D1 called the switchboard, or that the switchboard called D1 and D2, but since many other simultaneous communications, between other devices, can occur, the switchboard will call many other devices in the same time sequence as it calls D1 and D2, therefore, when there is other traffic in the network besides D1 and D2, a third party cannot determine between which two devices a communication occurs. Note that no device IDs are ever publicly shared.

7. In cases such as when a large number of subscribers exist (such as more than 100 million subscribers), the memory requirements can push up the cost of a device. For example, for 100 million subscribers in the network, and each encryption/decryption key is only 1000 bits wide, only the key memory (KM) in each device would require 100 Gbits. Such a large memory only for one of the required memories within a device increases the cost of a device. To keep the cost of a device low, a solution is as follows:

Premium users will use dedicated encryption keys. Other users will have encryption keys with various sharing levels. For example, 10, or 100, or 1000 users share the same encryption keys. To discuss a practical example, if the sharing is set to 16 users per encryption/decryption key, and there are 10 million keys in each device, the number of users is increased to 160 million, while the KM memory requirements is maintained as for 10 million users. In the case of communication without sharing device IDs, as described above, the switchboard will correctly establish a communication request based on the phone numbers encrypted in the request for communication, but the other 15 devices that share the data encryption/decryption key (such as the D1-D2 key) could intercept and read the message between the D1 and D2 (low probability, but existent when one of the 15 devices would breach a communication link through the switchboard with D1 and D2).

8. The specification above describes various approaches to securely communicate data between two devices. But there is an important application where only one device is involved—this application is data encryption for storage, such as on an external storage device or on cloud storage. To encrypt such data for storage, a dedicated encryption/decryption key specific for every device, called D1-D1, is used, this D1-D1 key being stored in every respective device KM. Data such encrypted. for storage on cloud for example, can be read back (decrypted) only by the device that encrypted it, using the same key (such as the same D1-D1 key), providing ultimate data security.

9. As mentioned, an encryption cycle can be repeated an unlimited number of times, each time with the same or with a different encryption/decryption key being used. The term "unlimited" refers in fact to a variable number of times, decided as a function of when a desired encryption strength is achieved. This variable number of cycles is between a first encryption cycle and a last encryption cycle, with the last encryption cycle generating the final encrypted output and the first encryption cycle encrypting the initial IFDS. The encryption cycles in-between the first and last encryption cycles are subsequent encryption cycles, where the encrypted output of the current encryption cycle becomes the input IFDS for the next subsequent encryption cycle. Specifying this variable number of cycles can be fixed or custom. A custom specification provides additional encryption strength.

A number of bits, part of the group of bits called option bits, as discussed above at (2), can be used to specify the number of encryption/decryption cycles, with a similar preferred implementation as described at (2).

At (4) above, each slice can be individually encrypted using a different encryption/decryption key. Similarly here, each encryption cycle can use a different encryption/decryption key. Therefore, the two cases, and all similar, will be discussed together in this section.

Since the number of slices, or the number of encryption cycles represent a variable, a number of encryption keys cannot be predicted to be hardcoded in KM, so that for example every cycle to have a distinct encryption key. Also, there is a limit as to how many encryption keys can be hardcoded as dedicated for communication between specific two devices, because multiple keys can notably increase the size of KM To address the above, a fixed number of encryption keys will be used to adapt to the specific needs. For example, if there are three encryption keys available in KM for communication between device 1 and device 2 and there are ten encryption cycles specified in the option bits, then the first key will be used for cycle 1, 4, 7, and 10, the second key will be used for cycle 2, 5, and 8, and the third key will be used for cycle 3, 6, and 9.

10. In the implementation when the switchboard (central unit) is used (7 above), the cases requiring option bits (such as 2, 4, and 9) can be implemented as described above, but, in this situation an additional level of encryption strength can be implemented.

In the implementation described above, variables such as the number of cycles, or the number of slices are set as specific to the two devices that communicate and are hardcoded in the OPM options memory. For the implementation using a switchboard, in the encrypted request to communicate, device 1 can communicate encrypted to device 2 a full set of custom options that device 1 prefers and sets. Neither device 1 nor device 2 will need the OPM anymore. Device 2 will encrypt the data for device 1, in accordance to the encryption/decryption key retrieved from its KM that is dedicated for the device 1 to device 2 communication, accounting at the same time for the options received from device 1 through the request to communicate. Once the encryption is completed, device 2 sends the encrypted data to device 1. Device 1 already has the options that it sent to device 2 through the request to communicate, but device 2 may include those options as well in the encrypted data. Device 1 will decrypt the data received from device 2 using the encryption/decryption key retrieved from its KM that is dedicated for device 1 to device 2 communication, accounting at the same time for the options that it has and that it sent to device 2 for encryption.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A digital data communication system, enabling communication of encrypted data, comprising a first device, a second device, and zero or more other devices, where a said device is either a data sender device when designed to encrypt any arbitrary binary input data string (IFDS) of a first size in term of number of bits that is larger than a minimum size, or a data receiver device when designed to decrypt any said IFDS, or a data sender/receiver device when designed to both encrypt and decrypt any said IFDS, or a data storage device when designed to store an encrypted said IFDS, wherein each said data sender device, data receiver device, or data sender/receiver device is assigned a unique device ID, also known as implementation ID, to uniquely identify said device, each said device has hardware blocks of specialized functionality that are internal to said device to encrypt said IFDS into an output file if said device is a said data sender or data sender/receiver device, to decrypt said output file back into said IFDS if said device is a said data receiver or a said data sender/receiver device, or to store said output file if said device is a said data storage device, and each said device is integrated in a hardware-based application of broad functionality that requires data encryption/decryption, with a said data sender, data receiver, data sender/receiver, or data storage device comprising:

- a first said hardware block known as standard allocation memory (SAM), implemented in a said data sender, data receiver, and data sender/receiver device, having a first number of storage locations that is divided between one or more storage banks, with each said storage location having a first-first number of bits storing standard allocation content that never changes, comprising:
  - each said storage bank is allocated for a value of a variable known as variable m with said value being greater or equal to one; and
  - each said storage bank is allocated a second number of said storage locations that is divided between one or more partitions, with said partitions comprising:
    - a first partition having a third number of said storage locations, storing a set of processing strings (PS), wherein:
      - each of said PS is unique, comprising a first-second number of bits of a unique sequence;
      - said set of PS is organized in one or more PS classes comprising a finite number of said PS with no two said PS classes having said PS of a same said first-second number of bits; and
      - said first-second number of bits of a said PS is smaller or equal to a first-fourth number that increases as said value of said variable m increases;
    - a second partition having a fourth number of said storage locations, storing a set of primary root identifiers (RI);
    - a third partition having a fifth number of said storage locations, storing a set of detail, wherein:
      - each said RI having a number of bits of a unique sequence, and each said detail has a number of bits;
      - each said unique PS is transformed, with said transformation comprising a unique said RI followed by a detail, with said number of bits of said RI plus said number of bits of said detail being equal to said first-second number of bits of said PS;
      - a number of said RI is developed for each of said PS classes;
      - said set of RI comprising all said RI developed for all said PS classes, and is organized in a number of RI classes comprising a finite number of said RI with no two said RI classes having said RI of a same number of bits; and
      - said set of detail comprising all said detail of all said PS, and is organized in a number of detail classes comprising a finite number of said detail with no two said detail classes having said detail of a same number of bits;
    - a fourth partition having a sixth number of said storage locations, storing said transformation of every PS into said unique RI and said detail;
    - a fifth partition having a seventh number of said storage locations, storing a set of pairs of said RI, known as RI pairs, wherein:
      - every said RI pair is formed by putting together two said unique RI, with each of said RI pair comprising a number of bits of a unique sequence;
      - said set of RI pairs is organized in a number of RI pair classes comprising a finite number of said RI pairs with no two said RI pair classes having said RI pairs of same number of bits; and
      - each said RI pair is transformed, with said transformation comprising a unique root identifier for said RI pair known as RI2 followed by an alternative, with the number of bits of said RI2 plus the number of bits of said alternative being equal to said number of bits of said RI pair;
    - a sixth partition having an eighth number of said storage locations, storing a set of said RI2, wherein:
      - a number of unique said RI2 is developed for each of said RI pair class; and
      - said set of RI2 comprising all said RI2 developed for all said RI pair classes, and is organized in a number of RI2 classes comprising a finite number of said RI2 with no two said RI2 classes having said RI2 of a same number of bits;
    - a seventh partition having a ninth number of said storage locations, storing a set of said alternatives, wherein:

said set of alternatives comprising all said alternatives for all said RI pairs, and is organized in a number of alternatives classes comprising a finite number of said alternatives with no two said alternatives classes having said alternatives of a same number of bits; and an eighth partition having a tenth number of said storage locations, storing said transformation of every said RI pair into said unique RI2 and said alternative;

with said PS, RI, detail, RI pair, RI2, alternatives, aggregately being called binary constructs, said PS classes, RI classes, detail classes, RI pair classes, RI2 classes, alternatives classes, aggregately being called classes, and said set of PS, set of RI, set of detail, set of RI pair, set of RI2, set of alternatives, aggregately being called sets;

a second said hardware block known as operational memory (OM), implemented in a said data sender, data receiver, and data sender/receiver device, storing one of said storage banks that is copied from said SAM and is modified for encryption/decryption, comprising:

copying a said storage bank corresponding to a said value of said variable m from said SAM into said OM, called copied storage bank;

first modifying in said OM said copied storage bank by modifying one or more of said classes of one or more of said first, second, third, fifth, sixth, and seventh partitions of said copied storage bank, called modified class, by permutating said binary constructs of said modified class, comprising:

reading said binary constructs of a said modified class and creating a storage location log of said storage location of each said read binary construct;

applying permutations among said read binary constructs of said modified class; and writing back said permutated binary constructs of said modified class at same said storage locations as in said storage location log; while defining a first read operation as a read operation of said binary constructs of said modified class in said SAM;

defining a second read operation as a read operation of said binary constructs of said modified class in said OM;

defining a first encryption operation to encrypt a first said binary construct of a first said modified class from said SAM called unencrypted binary construct, as a read sequence comprising a said first read operation where a first location in said SAM for said unencrypted binary construct is extracted, followed by a said second read operation where a said binary construct of said first modified class, located in said OM at said first location, called encrypted binary construct of said unencrypted binary construct, is extracted; and defining a first decryption operation to decrypt said encrypted binary construct of said unencrypted binary construct, as a read sequence comprising a said second read operation where a first location in said OM for said encrypted binary construct of said unencrypted binary construct is extracted, followed by a said first read operation where said unencrypted binary construct located in said SAM at said first location is extracted; and second modifying in said OM said copied storage bank by updating said binary constructs from said fourth partition in said OM with said binary constructs of said second and third partitions from said OM that are said first modified, and by updating said binary constructs from said eighth partition in said OM with said binary constructs of said sixth and seventh partitions from said OM that are said first modified, comprising:

reading every said RI and detail of said fourth partition in said OM;

updating said fourth partition by using a said first encryption operation for said second partition for every said read RI to obtain an encrypted RI, and for said third partition for every said read detail to obtain an encrypted detail, and by writing back said encrypted RI and encrypted detail, resulting in updated fourth partition;

reading every said RI2 and alternative of said eighth partition in said OM; and updating said eighth partition by using a said first encryption operation for said sixth partition for every said read RI2 to obtain an encrypted RI2, and for said seventh partition for every said read alternative to obtain an encrypted alternative, and by writing back said encrypted RI2 and encrypted alternative, resulting in updated eighth partition;

a third said hardware block, known as specialized controller (SC) of specialized functionality, comprising:

a first group of said specialized functionality, implemented in a said data sender, data receiver, and data sender/receiver device, comprising:

a first-first said specialized functionality of interpreting an encryption/decryption key having a total number of bits, comprising indicating said copied storage bank and said first modifying and said second modifying said copied storage bank in said OM for encryption/decryption, comprising:

a first number of bits that is part of said total number of bits of said encryption/decryption key is specifying a said value of said variable m, i.e. is specifying said storage bank to be copied from said SAM into said OM;

a second number of bits that is part of said total number of bits of said encryption/decryption key is specifying one or more of said first to eighth partition of said copied storage bank having one or more of said modified class, called modified OM partitions;

a third number of bits that is part of said total number of bits of said encryption/decryption key is specifying one or more of said modified classes within each of said modified OM partitions; and a fourth number of bits that is part of said total number of bits of said encryption/decryption key is specifying within each of said modified classes, permutations that are performed among said binary constructs of each of said modified class, called modified OM binary constructs;

a second group of said specialized functionality, implemented in a said data sender and data sender/receiver device, producing one or more levels of encryption hierarchy in encrypting a said IFDS, comprising:

a second-first said specialized functionality enabling a first level of encryption hierarchy, comprising creating said OM by copying a said copied storage bank and by said first modifying and second modifying said copied storage bank in accordance to said encryption/decryption key;

a second-second said specialized functionality of fully and uniquely partitioning said IFDS in term of said PS that are defined in accordance to said copied storage bank, by accessing in said SAM said first partition and by recognizing a said PS in said IFDS, such creating a series of consecutive PS that occur in said IFDS, with every said consecutive PS receiving a first order number alternating as odd number followed by even number, and such enabling a second level of encryption hierarchy comprising in encrypting said consecutive PS as they belong to one or more of said modified classes as PS classes, by using said first encryption operation for said first partition;

a second-third said specialized functionality of transforming every said consecutive PS out of said second-second specialized functionality into said RI and said detail, by accessing in said SAM said fourth partition of said copied storage bank for each said consecutive PS, with each said RI and detail receiving same said odd number or even number as said consecutive PS from which it was said transformed, respectively receiving odd number RI and odd number detail for an odd number consecutive PS, and even number RI and even number detail for an even number consecutive PS;

a second-fourth said specialized functionality of enabling a third level of encryption hierarchy applied to said RI and detail out of said second-third specialized functionality, comprising in encrypting said RI and detail as they belong to one or more of said modified classes as RI classes and detail classes, by using said first encryption operation for said fourth partition;

a second-fifth said specialized functionality of creating said RI pairs from said RI out of said second-fourth specialized functionality, by putting together every two said odd number RI and even number RI, with said odd number detail and even number detail creating a detail pair attached to said RI pair, such enabling a fourth level of encryption hierarchy comprising in encrypting said RI pair as they belong to one or more of said modified classes as RI pair classes, by using said first encryption operation for said fifth partition;

a second-sixth said specialized functionality of transforming every said RI pair out of said second-fifth specialized functionality into said RI2 and said alternative by accessing in said SAM said eighth partition of said copied storage bank for each said RI pair;

a second-seventh said specialized functionality of enabling a fifth level of encryption hierarchy applied to said RI2 and alternative out of said second-sixth specialized functionality, comprising in encrypting said RI2 and alternative as they belong to one or more of said modified classes as RI2 classes and alternative classes, by using said first encryption operation for said eighth partition;

wherein said minimum size of said IFDS comprising said number of bits of two said odd number PS and even number PS;

a second-eighth said specialized functionality of generating an output file representing said encrypted IFDS, by writing every said RI2 and alternative out of said second-seventh specialized functionality, followed by said detail pair created during said second-fifth specialized functionality; and a second-ninth said specialized functionality comprising calling that an encryption cycle is completed once said output file is generated, writing said implementation ID in said output file, and erasing said OM; and a third group of said specialized functionality, implemented in a said data receiver device and data sender/receiver device, decrypting said one or more levels of encryption hierarchy used to generate said output file, and such restoring said IFDS, comprising:

a third-first said specialized functionality of decrypting said first level of encryption hierarchy, comprising creating said OM by copying a said copied storage bank and by said first modifying and second modifying said copied storage bank in accordance to said encryption/decryption key;

a third-second said specialized functionality comprising in recognizing in said output file a said RI2 and alternative by accessing said eighth partition in said OM, and such enabling decrypting said fifth level of encryption hierarchy comprising in decrypting said RI2 and alternative by using said first decryption operation applied to said eighth partition;

a third-third said specialized functionality of restoring a said RI pair by accessing said fifth partition in said OM using said RI2 and alternative out of said third-second specialized functionality, such enabling decrypting said fourth level of encryption hierarchy comprising in decrypting said RI pair by using said first decryption operation applied to said fifth partition, while assigning a said odd number and an even number to the first respectively second RI in said RI pair, such obtaining said odd number RI followed by said even number RI;

a third-fourth said specialized functionality of matching said odd number RI out of said third-third specialized functionality with said odd number detail of said detail pair created during said second-fifth specialized functionality out of said output file, and similarly matching said even number RI with said even number detail, such enabling decrypting said third level of encryption hierarchy comprising in decrypting said RI and detail of said odd number RI and odd number detail respectively said even number RI and even number detail by using said first decryption operation applied to said fourth partition;

a third-fifth said specialized functionality of restoring said odd number PS followed by said even number PS by accessing said first partition in said OM for every said odd number RI and odd number detail and said even number RI and even number detail out of said third-fourth specialized functionality, such enabling decrypting said second level of encryption hierarchy comprising in decrypting said odd number PS and even number PS by using said first decryption operation applied to said first partition; and a third-sixth said specialized functionality, comprising generating said IFDS by writing every said odd number PS followed by said even number PS out of said third-fifth specialized functionality, calling that a decryption cycle is completed once said IFDS is generated, and erasing said OM;

a fourth said hardware block as an encryption/decryption keys memory (KM), implemented in a said data sender device, data receiver device, and data sender/receiver device, storing a first number of said encryption/decryption keys with each said encryption/decryption key having a said total number of bits, with one or more said encryption/decryption keys being assigned and dedicated to be used to communicate said encrypted data between every two specific devices only, i.e., said first device is storing in said KM of said first device one or more said encryption/decryption keys assigned and dedicated to be used to communicate said encrypted data with said second device only, and said second device is storing in said KM of said second device same one or more encryption/decryption keys as stored in said KM of said first device assigned and dedicated to be used to communicate said encrypted data with said first device only; and a fifth said hardware block known as storage device (SD), implemented in a said data storage device, storing a said output file.

2. The digital data communication system of claim 1, describing said communication of encrypted data between two devices through a central unit, comprising:

a said first device as a said data sender or a said data sender/receiver device, having a first said implementation ID and a first public address;

a said second device as a said data receiver device or a said data sender/receiver device, having a second said implementation ID and a second public address;

a central unit (CU) having a third public address designed to coordinate said communication of encrypted data between said first device and said second device, comprising:

a specialized processing unit (SPU) of specialized functionality which assigns said first and second public address to each said first and second device, such enabling said CU to recognize said first and second device by recognizing said first and second public address;

a storage device unit known as Request for Communication Memory (RCM) storing dedicated encryption/decryption keys associated with said first and second public addresses that are used by said CU to communicate encrypted with each of said first and second devices, and with said RCM being also implemented in said first and second device; and a storage device unit known as correspondence memory (CM) that makes the correspondence between said first and second public address and said first and second implementation ID;

a first-first group of said specialized functionality performed by said SPU of said CU, comprising:

recognizing said first device by recognizing said first public address when said first device is sending to said CU an encrypted request to communicate comprising said first and second public address;

decrypting said request to communicate, by retrieving from said RCM of said CU a said dedicated encryption/decryption key for communication between said CU and said first device, such determining said first and second public address involved in said communication of encrypted data, and such determining said implementation ID for said first and second device as retrieved from said CM; and establishing a communication channel between said first and second device by encrypting a communication channel message to be sent by said CU to each of said first and second devices using dedicated encryption/decryption keys for communication between said CU and said first respectively second device retrieved from said RCM of said CU, and by sending said communication channel message to each said first and second device by using said first respectively second public address, with said communication channel message comprising said retrieved implementation ID from said CM for said first and second device and said first and second public address;

a first-second group of said specialized functionality performed by said specialized controller of said first device, implemented in a said data sender and data sender/receiver device, comprising:

modifying said second-ninth specialized functionality by not writing in said output file said implementation ID and instead not writing anything;

sending to said CU said request to communicate by using said third public address, comprising encrypting by using said dedicated encryption/decryption key for communication between said CU and said first device retrieved from said RCM of said first device;

receiving from said CU and decrypting said communication channel message, by using said dedicated encryption/decryption key for communication between said CU and said first device retrieved from said RCM of said first device;

retrieving a said unique encryption/decryption key from said KM of said first device that is dedicated for said communication with said second implementation ID;

encrypting said IFDS by using said retrieved encryption/decryption key from said KM of said first device; and transmitting said output file to said second device by using said second public address through said communication channel; and a first-third group of said specialized functionality performed by said specialized controller of said second device, implemented in a said data receiver, and data sender/receiver device, comprising:

receiving from said CU and decrypting said communication channel message, by using said dedicated encryption/decryption key for communication between said CU and said second device retrieved from said RCM of said second device, retrieving a said unique encryption/decryption key from said KM of said second device that is dedicated for said communication with said first implementation ID; and decrypting said output file received from said first device by using said retrieved encryption/decryption key from said KM of said second device;

with said encrypting comprising employing said first-first specialized functionality and said third group of said specialized functionality while said decrypting comprising employing said first-first specialized functionality and all said third group of said specialized functionality.

3. The digital data communication system of claim 2, further comprising an additional level of encryption hierarchy focused on encryption over multiple said encryption cycles, comprising:

a first-first group of said specialized functionality, performed by said specialized controller, implemented in a said data sender, and data sender/receiver device, comprising:

using a third-first number of bits that are part of a group of bits called encryption option bits to specify a first number of said encryption cycles that is greater or equal to two that are used to encrypt said IFDS;

assigning a said encryption/decryption key to each of said first number of encryption cycles, while using a third-second number of bits that are part of said encryption option bits to specify which said encryption/decryption key is assigned to each said encryption cycle of said first number of encryption cycles; and encrypting said IFDS using said first number of encryption cycles with a first said encryption cycle generating a said output file called intermediary IFDS, with a last said encryption cycle generating a said output file called encrypted IFDS, and zero or more said encryption cycles between said first encryption cycle and said last encryption cycle, called subsequent encryption cycle, encrypting said intermediary IFDS and generating a said output file called new intermediary IFDS; and a first-second group of said specialized functionality, performed by said specialized controller, implemented in a said data receiver, and data sender/receiver device, comprising:

decrypting said encrypted IFDS using a number of said decryption cycles equal to said first number of said encryption cycles with a first said decryption cycle decrypting said encrypted IFDS and generating a said intermediary IFDS, with a last said decryption cycle restoring said IFDS and zero or more said decryption cycles between said first decryption cycle and said last decryption cycle, called subsequent decryption cycle, decrypting said intermediary IFDS and generating a new intermediary IFDS, where each said decryption cycle of said first number of said decryption cycles uses the same said encryption/decryption key as assigned to each of said first number of encryption cycles and as indicated by said third-second number of bits;

with said encryption option bits being custom chosen by said first device and being securely communicated to said second device, wherein:

said encryption option bits being custom chosen by said first device comprising the user of said first device manually choosing said first number of encryption cycles; and said encryption option bits being securely communicated to said second device comprising:

attaching said encryption option bits to said encrypted IFDS by said specialized controller of said first device to obtain a total encrypted IFDS;

encrypting said total encrypted IFDS by said first device using a said encryption/decryption key dedicated for said communication of encrypted data between said first and second device, retrieved from said KM of said first device, to generate an encrypted total IFDS;

transmitting said encrypted total IFDS by said first device to said second device through said communication channel using said second public address;

decrypting said encrypted total IFDS by said second device using a said encryption/decryption key dedicated for said communication of encrypted data between said first and second device, retrieved from said KM of said second device, to generate said total encrypted IFDS and such retrieving said encryption option bits; and decrypting said encrypted IFDS by said second device, to generate said IFDS, by using said third-first and said third-second number of bits.

4. The digital data communication system of claim 2, wherein said request to communicate is sent unencrypted from said first device to said central unit.

5. The digital data communication system of claim 2, wherein said communication channel between said first and second device is through said central unit, such masking direct communication between said first and second device, comprising:

sending said output file by said first device to said central unit by using said third public address; and sending said output file received from said first device by said central unit from said central unit to said second device by using said second public address;

with having all said communication between said first and second device occurring through said central unit, such masking direct communication between said first and second device.

6. The digital data communication system of claim 1, further comprising an additional level of encryption hierarchy focused on creating and encrypting pairs of said PS, comprising:

a first-first group of said specialized functionality, performed by said specialized controller, implemented in a said data sender, and data sender/receiver device, comprising:

dividing said uniquely partitioned IFDS in groups of a first even number of said consecutive PS called pairing ranges;

pairing any two said PS within a said pairing range, to create a total number of pairs of PS equal to said first even number divided by two;

using a group of bits called encryption option bits to specify said first even number of bits and said any two PS within a said pairing range as they are paired;

creating a nineth partition of an eleventh number of said storage locations for a said storage bank in said SAM, storing a set of said pairs of PS, known as PS pairs, wherein:

every said PS pair is formed by putting together two said unique PS, with each of said PS pair comprising a number of bits of a unique sequence; and said set of PS pairs is organized in a number of PS pair classes comprising a finite number of said PS pairs with no two said PS pair classes having said PS pairs of same number of bits;

with said PS, PS pairs, RI, detail, RI pair, RI2, alternatives, aggregately being called binary constructs, said PS classes, PS pair classes, RI classes, detail classes, RI pair classes, RI2 classes, alternatives classes, aggregately being called classes, and said set of PS, set of PS pairs, set of RI, set of detail, set of RI pair, set of RI2, set of alternatives, aggregately being called sets; and creating a second-tenth said specialized functionality of enabling a sixth level of encryption hierarchy that is acting between said second-second and second-third specialized functionality, comprising in encrypting one or more of said modified classes as said PS pair classes, by using said first encryption operation for said nineth partition; and a first-second group of said specialized functionality, performed by said specialized controller, implemented in a said data receiver, and data sender/receiver device, comprising:

creating a third-seventh specialized functionality of decrypting said sixth level of encryption hierarchy that is acting between said third-fifth and third-sixth specialized functionality, comprising decrypting said PS pairs by using said first decryption operation applied to said ninth partition while using said encryption option bits to restore said first even number divided by two number of PS pairs and said every two PS within said pairing range as they have been paired;

with said encryption option bits being pre-set as either to be part of said data encryption/decryption key as a fifth number of bits that is part of said total number of bits, or to be part of a special options memory (OPM) present in every said data sender, data receiver, and data sender/receiver device as a sixth said hardware block; and with said minimum size of said IFDS comprising said number of bits of said first even number of consecutive PS within said pairing range.

7. The digital data communication system of claim 1, further comprising an additional level of encryption hierarchy focused on creating and encrypting slices of said IFDS, comprising:

a first-first group of said specialized functionality, performed by said specialized controller, implemented in a said data sender, and data sender/receiver device, comprising:

dividing said IFDS in consecutive slices with each slice having a second size in term of number of bits wherein the sum of said second size of each of said slice is equal to said first size, while using a third-first number of bits that are part of a group of bits called encryption option bits to specify said second size for each of said consecutive slices;

assigning to each of said consecutive slices an order number in ascending order starting with order number one assigned to the first slice in said IFDS;

assigning a said encryption/decryption key to each said consecutive slice and such individually encrypting each said consecutive slice, such generating a said output file for each said consecutive slice that preserves said order number assigned to each said consecutive slice, while using a third-second number of bits that are part of said encryption option bits to specify which said encryption/decryption key is assigned to each said consecutive slice; and generating an encrypted IFDS by assembling said output file of each said consecutive slice as specified by a third-third number of bits that are part of said encryption option bits describing permutations of said order numbers of every said consecutive slices, with said permutations changing the order in which said slices are assembled to generate said encrypted IFDS; and a first-second group of said specialized functionality, performed by said specialized controller, implemented in a said data receiver, and data sender/receiver device, comprising:

reversing said assembling of said output file of each said consecutive slice by reversing said permutations of said order numbers of every said consecutive slices as indicated by said third-third and third-first number of bits, in order to obtain said slices to be in the order as initially indicated by said assigned order number of each said consecutive slices; and decrypting each said output file of each said consecutive slice while using said third-second and third-first number of bits, in order to generate said IFDS;

with said encryption option bits being pre-set as either to be part of said data encryption/decryption key as a fifth number of bits that is part of said total number of bits, or to be part of a special options memory (OPM) present in every said data sender, data receiver, and data sender/receiver device as a sixth said hardware block.

8. The digital data communication system of claim 7 wherein said encryption option bits are customized rather than being said pre-set, comprising:

a first-third group of said specialized functionality, performed by said specialized controller, implemented in a said data sender, and data sender/receiver device, comprising:

attaching said encryption option bits to said encrypted IFDS, obtaining a total output file;

encrypting said total output file using a said assigned and dedicated encryption/decryption key, obtaining a transmittable output file; and a first-fourth group of said specialized functionality, performed by said specialized controller, implemented in a said data receiver, and data sender/receiver device, comprising:

decrypting said transmittable output file, such obtaining said encryption option bits applicable to decrypt said encrypted IFDS; and decrypting said encrypted IFDS while using said option bits, to obtain said IFDS.

9. The digital data communication system of claim 1, further comprising an additional level of encryption hierarchy focused on encryption over multiple said encryption cycles, comprising:

a first-first group of said specialized functionality, performed by said specialized controller, implemented in a said data sender, and data sender/receiver device, comprising:

using a third-first number of bits that are part of a group of bits called encryption option bits to specify a first number of said encryption cycles that is greater or equal to two that are used to encrypt said IFDS;

assigning a said encryption/decryption key to each of said first number of encryption cycles, while using a third-second number of bits that are part of said encryption option bits to specify which said encryption/decryption key is assigned to each said encryption cycle of said first number of encryption cycles; and encrypting said IFDS using said first number of encryption cycles with a first said encryption cycle generating a said output file called intermediary IFDS, with a last said encryption cycle generating a said output file called encrypted IFDS, and zero or more said encryption cycles between said first encryption cycle and said last encryption cycle, called subsequent encryption cycle, encrypting said intermediary IFDS and generating a said output file called new intermediary IFDS; and a first-second group of said specialized functionality, performed by said specialized controller, implemented in a said data receiver, and data sender/receiver device, comprising:

decrypting said encrypted IFDS using a number of said decryption cycles equal to said first number of said encryption cycles with a first said decryption cycle decrypting said encrypted IFDS and generating a said intermediary IFDS, with a last said decryption cycle restoring said IFDS and zero or more said decryption cycles between said first decryption cycle and said last decryption cycle, called subsequent decryption cycle, decrypting said intermediary IFDS and generating a new intermediary IFDS, where each said decryption cycle of said first number of said decryption cycles uses the same said encryption/decryption key as assigned to each of said first number of encryption cycles and as indicated by said third-second number of bits;

with said encryption option bits being pre-set as either to be part of said data encryption/decryption key as a fifth number of bits that is part of said total number of bits, or to be part of a special options memory (OPM) present in every said data sender, data receiver, and data sender/receiver device as a sixth said hardware block.

10. The digital data communication system of claim 1 enabling conferencing communication, comprising:

a said first device as a said data sender or a said data sender/receiver device;

a said second device as a said data receiver device or data sender/receiver device; and one or more of said other devices as said data receiver device or data sender/receiver device;

with one or more said encryption/decryption key used for said communication of encrypted data, called non-device specific key, being the same for said first, second, and one or more other devices.

11. The digital data communication system of claim 1, enabling archival communication, comprising:

a said first device as a said data sender/receiver device; and a said second device as a said data storage device;

with said first device using a said encryption/decryption key that is dedicated only for said first device to encrypt and write in respectively read and decrypt from a said second device; and with said encryption/decryption key being retrieved by said specialized controller of said first device from said KM of said first device every time said first device writes in or reads from a said second device.

12. A digital data communication system, enabling communication of encrypted data, comprising:

a first-first device called sender, encrypting an input data string (IFDS) into an output file and transmitting said output file to a first-second device, being assigned a unique first implementation ID to uniquely identify said first-first device and a first unique public address;

a said first-second device called receiver, receiving said output file from said first-first device and decrypting said output file back into said IFDS, being assigned a unique second implementation ID to uniquely identify said first-second device and a second unique public address;

a central unit (CU) designed to coordinate said communication of encrypted data between said sender and said receiver, being assigned a third unique public address;

a standard allocation memory (SAM), implemented in both said sender and said receiver devices, storing reference data comprising one or more set of binary constructs, also known as set of strings, comprising processing strings (PS), root identifiers (RI), and derivatives of said PS and RI, or replicas of said PS, RI, and of said derivatives of PS and RI, comprising:

a said set of strings, capable to fully and uniquely describe any said IFDS, is stored in said SAM, with each said string in said set of strings having a number of bits of a unique sequence and being part of a class, with a said class having one or more of said strings of a same said number of bits with no two said classes having said strings of a same said number of bits;

an operational memory (OM), implemented in both said sender and said receiver devices, where one or more said set of strings is copied from said SAM and is modified in accordance to an encryption/decryption key that has a total number of bits, comprising:

said total number of bits is divided in one or more groups of bits comprising a first said group of bits specifying to copy a said set of strings from said SAM into said OM, a second said group of bits specifying a said class in said copied set of strings to be modified, and a third said group of bits specifying permutations that are performed among said strings of said class specified by said second group of bits;

a specialized controller (SC), implemented in both said sender and said receiver devices to have different specialized functionality for encryption and decryption, comprising:

a first said specialized functionality of encrypting said IFDS, implemented in said SC of said sender device, comprising:

recognizing a series of said strings from said SAM, also known as SAM strings, as they occur in said IFDS, resulting in said IFDS being described by a series of consecutive said SAM strings;

determining location in said SAM of every said consecutive SAM string called determined location;

reading from said OM at said determined location a said string called OM string;

replacing in said IFDS every said consecutive SAM string with said OM string resulting in said IFDS being described by a series of consecutive said OM strings; and generating said output file by serially outputting every said consecutive OM string; and a second said specialized functionality of decrypting said output file, implemented in said SC of said receiver device, comprising:

recognizing a series of said consecutive OM strings as they occur in said output file;

determining location in said OM of every said consecutive OM string called determined location;

reading from said SAM at said determined location a said SAM string;

replacing in said output file every said consecutive OM string with said SAM string, resulting in said consecutive SAM strings; and generating said IFDS by serially outputting every said consecutive SAM string;

an encryption/decryption keys memory (KM), implemented in both said sender and said receiver devices, to store a first number of said encryption/decryption keys with each said encryption/decryption key being of a said total number of bits, with one of said encryption/decryption keys being assigned and dedicated to be used to communicate said encrypted data between said first and second implementation ID only;

a request for communication memory (RCM) implemented in both said sender and said receiver devices and in said CU, storing dedicated encryption/decryption keys associated with said first and second public addresses that are being used by said CU to communicate encrypted with each of said sender and said receiver devices;

a correspondence memory (CM) implemented in said CU that makes the correspondence between said public address and said implementation ID of said sender and said receiver devices; and a specialized processing unit (SPU), implemented in said CU, establishing a communication channel between said sender and said receiver devices, comprising:

decrypting a request for communication message sent encrypted using said dedicated encryption/decryption keys retrieved from said RCM by said sender device to said CU with said request for communication comprising said first and second public address;

encrypting a communication message to each of said sender and receiver devices using said dedicated encryption/decryption keys retrieved from said RCM of said CU for each of said sender and receiver devices; and sending said encrypted communication message to each said sender and receiver devices by using said first respectively second public address, with said encrypted communication message comprising said first and second implementation ID retrieved from said CM and said first and second public address.

13. The digital data communication system of claim 1 wherein one or more of said hardware blocks of a said device are not said internal within said device, comprising:

said first hardware block is allocated within a data storage device of said hardware-based application;

said second hardware block is allocated within a data storage device of said hardware-based application;

said fourth hardware block is allocated within a data storage device of said hardware-based application; and said third hardware block with their said specialized functionality are fully or partly taken over by a hardware processor of broad functionality within said hardware-based application, that can perform said specialized functionality by following a series of software instructions.

14. The digital data communication system of claim 1, describing said communication of encrypted data between two devices, featuring a hidden device, comprising:

a said first device as a said data sender or a said data sender/receiver device, having a first said implementation ID and a first public address;

a said second device as a said data receiver device or a said data sender/receiver device, having a second said implementation ID and a second public address;

with said first and second public address enabling said communication between said first and second device without said identifying said first and second device;

a first-first group of said specialized functionality performed by said specialized controller of said first and second device, implemented in a said data sender, data receiver, and data sender/receiver device, comprising:

identifying each of said first number of encryption/decryption keys in said KM of said device by using a unique combination of a first number of identification bits; and charting a correspondence between a said unique encryption/decryption key and a said unique combination, with a said encryption/decryption key dedicated for said communication between said first and second device having same said unique combination in both said KM of said first and second devices;

a first-second group of said specialized functionality performed by said specialized controller of said first device, implemented in a said data sender and data sender/receiver device, comprising:

receiving from said second device a request to communicate, unencrypted, comprising said second implementation ID;

retrieving a said encryption/decryption key from said KM of said first device that is dedicated for said communication with said second implementation ID;

encrypting said IFDS using said retrieved encryption/decryption key by employing said first-first specialized functionality and said second group of said specialized functionality;

modifying said second-ninth specialized functionality by not said writing in said output file said first implementation ID, and instead writing in said output file said unique combination that corresponds to said unique encryption/decryption key that is used to encrypt data for said second implementation ID, such hiding said identifying said first device called hidden device; and transmitting said output file to said first-second device using said second public address; and a first-third group of said specialized functionality performed by said specialized controller of said second device, implemented in a said data receiver and data sender/receiver device, comprising:

sending said request to communicate, unencrypted, to said first device using said first public address, comprising said second implementation ID;

receiving said output file from said first device and reading from said output file said unique combination;

retrieving said unique encryption/decryption key from said KM of said second device located at a location indicated by said unique combination; and decrypting said output file using said retrieved encryption/decryption key by employing said first-first specialized functionality and said third group of said specialized functionality.

15. The digital data communication system of claim 12 where said communication of encrypted data is said coordinated directly by said sender and said receiver devices, comprising:

a first-first group of said specialized functionality, implemented in said specialized controller of said sender device, comprising:

sending a said request for communication by said sender device to said receiver device, unencrypted, using said second public address, with said request for communication comprising said first implementation ID;

receiving by said sender device from said receiver device a response to said request for communication, unencrypted, comprising said second implementation ID;

retrieving, from said KM of said sender device, a said encryption/decryption key that is dedicated for communication of said first implementation ID with said second implementation ID, and encrypting said IFDS using said retrieved encryption/decryption key; and transmitting said output file to said receiver device; and a first-second group of said specialized functionality, implemented in said specialized controller of said receiver device, comprising:

receiving by said receiver device said request for communication from said sender device, unencrypted;

sending by said receiver device to said sender device, using said first public address, said response to said request for communication, unencrypted; and retrieving, from said KM of said receiver device, a said encryption/decryption key that is dedicated for communication of said second implementation ID with said first implementation ID; and decrypting said output file using said retrieved encryption/decryption key.

* * * * *